United States Patent [19]
Smith

[11] Patent Number: 5,796,922
[45] Date of Patent: Aug. 18, 1998

[54] TRAINABLE, STATE-SAMPLED, NETWORK CONTROLLER

[75] Inventor: Jay L. Smith, Ogden, Utah

[73] Assignee: Weber State University, Ogden, Utah

[21] Appl. No.: 626,181

[22] Filed: Mar. 29, 1996

[51] Int. Cl.⁶ ..................................................... G06F 15/18
[52] U.S. Cl. .............................. 395/22; 395/21; 395/87; 395/903; 395/906; 395/907
[58] Field of Search ............................. 395/22, 903, 906, 395/907, 87, 21

[56] References Cited

U.S. PATENT DOCUMENTS

| | | | |
|---|---|---|---|
| 3,937,423 | 2/1976 | Johansen | 244/3.22 |
| 4,193,115 | 3/1980 | Albus | 364/300 |
| 4,620,286 | 10/1986 | Smith et al. | 364/513 |
| 4,802,103 | 1/1989 | Faggin et al. | 364/513 |
| 5,172,253 | 12/1992 | Lynne | 395/22 |
| 5,175,797 | 12/1992 | Funabashi et al. | 395/22 |
| 5,268,834 | 12/1993 | Sanner et al. | 395/22 |
| 5,335,164 | 8/1994 | Gough, Jr. et al. | 364/149 |
| 5,355,065 | 10/1994 | Narazaki et al. | 318/632 |
| 5,369,645 | 11/1994 | Pritchard et al. | 371/22.1 |
| 5,371,834 | 12/1994 | Tawel | 395/23 |
| 5,394,322 | 2/1995 | Hansen | 364/148 |
| 5,448,681 | 9/1995 | Khan | 395/22 |
| 5,479,573 | 12/1995 | Keeler et al. | 395/23 |
| 5,493,631 | 2/1996 | Huang et al. | 395/22 |
| 5,513,098 | 4/1996 | Spall | 395/21 |
| 5,515,454 | 5/1996 | Buckley | 395/21 |
| 5,517,600 | 5/1996 | Shimokawa | 395/27 |
| 5,583,964 | 12/1996 | Wang | 395/11 |
| 5,586,221 | 12/1996 | Isik et al. | 395/22 |
| 5,640,491 | 6/1997 | Bhat et al. | 395/22 |
| 5,646,869 | 7/1997 | Kaneko | 395/207 |
| 5,668,717 | 9/1997 | Spall | 395/21 |

Primary Examiner—George B. Davis
Attorney, Agent, or Firm—Berne S. Broadbent; Dale E. Hulse

[57] ABSTRACT

A trainable, state-sampled, network controller (TSSNC) or state-sampled controller (SSC) requires little information regarding a plant (as with neural networks), but can use what information is available (as in classical controllers), and provides a linear network (as for CMAC) improving calculation speeds. A form of a governing differential equation characterizing a plant may include parameters and their derivatives of various orders as variables combined in linear and nonlinear terms. Classical control theory, and a method such as a Fourier transform of governing equations, may provide 8a form of a control law, linear in certain weights or coefficients. Knowledge of coefficients is not required for either the form of the governing equations or the form of the control law. An optimization method may be used to train the SSC, defining a table of weights (contributions to coefficients) to be used in the matrix equation representing the control law the solution yielding a control output to the plant. Sampling plant outputs, during training, may be done at a selected spatial frequency in state space (each dimension a variable from the control law). Sampling is used to provide ideal interpolation of the weights over the entire range of interest. Minimum memory is used with maximum accuracy of interpolation, and any control/output value may be calculated as needed in real time by a minimal processor.

21 Claims, 15 Drawing Sheets

TRAINABLE, STATE-SAMPLED, NETWORK CONTROLLER

BACKGROUND

1. The Field of the Invention

This invention relates to controllers and, more particularly, to novel systems and methods for making, programming, and operating linear network controllers.

2. The Background Art

Controllers may be divided between classical controllers and Networks. Classical controllers use a control law specified by one or more governing equations known in advance. Classical controllers define variables and the order of those variables in the equation or equations of the control law.

Network controllers rely on some method of solving for an ad hoc control relationship. Networks do not need to "know" the governing equations of a specific plant that they are controlling. Certain network controllers are adapted to making decisions inferentially. For example some network controllers, or "networks," may be trained to a set of rules not known in advance. For example, a neural network merely needs some set of outputs and inputs accumulated from a plant during a learning period to create some control rule for controlling the plant in the future.

Networks may be divided into neural networks and linear networks. Network controllers include neural networks, cerebellar model articulation controllers (CMAC), adaptive control systems, and other trainable or learning networks. Neural networks "learn" by trial, error, and comparison of inputs with outputs for each component or parameter that may be varied, and each that may be measured.

Neural networks have created excitement in control engineering, but appear almost magical in nature, relying on little mathematical information, but providing few answers to issues such as stability, observability, controllability, steady-state error, optimal design criteria, and dynamic characteristics. Input/output relationships are masked behind complex, nonlinear functions. Moreover, mathematical rigor has not been developed upon which engineers can rely.

Neural networks are comprised of a plurality of artificial neurons. The perception network is a very popular neural network. However, neural networks have no reliable mathematical model with which to minimize a cost function. Cost function minimization is necessary for the designers to choose an optimal design for a given criterion.

Moreover, the configuration of neural networks is not guided by any definitive criteria for determining a "best" configuration of the network. How many cells, how may layers, what types of nonlinearities are required, how to train the network, how to evaluate a design, and the like, are not pre-determined. A designer needs to be enabled to determine whether or not a controller is adequately sophisticated to accomplish a set of design goals, and yet is not so elaborate as to add additional cost or complexity unnecessarily.

Many neural networks never complete training. Assuming that a neural network will train, an unknown number of iterations will be required for the training. Assurance of training of a network in a reasonably short time, or a finite time, in some cases, is needed.

Linear networks use a linear set of simultaneous equations having variables (parameters of influence) which may include outputs and inputs. Each variable in an equation has a leading coefficient associated with it to scale the contribution of the variable to the equation. A linear system solver or other matrix system solver may be used to solve a system of resulting equations, defining the coefficients. The best known trainable network used as a linear network controller is the cerebellar model articulation controller (CMAC).

Linear networks operate at comparatively high speed because their digital calculation processes are relatively high, as opposed to nonlinear networks such as neural networks.

Classical controllers can adequately address control of plants about which certain key characteristics are known. Neural networks, by contrast, assume almost no knowledge, and typically have no way to use knowledge about a system. Many networks are simply mathematical constructs that cannot be implemented in any practical hardware system. Implementation of some network computer concepts would require large numbers of the largest computers in the world operating for years to handle very real control problems.

A controller is needed that does not require complete knowledge of the system. Such a controller would be very much more desirable if it can use certain limited knowledge, such as form, order, or the frequency content of a plant or of a disturbance function. Likewise, a controller is needed that can be created or "realized." A trainable controller is needed that can move from a theoretical construct on a solid mathematical footing to an implementation in software and hardware.

What is needed is a controller that may be programmed on a single chip to use a minimum number of instructions, minimum memory, and yet provide a rapidly trainable controller. It would be beneficial to have an optimizable controller for a system of unknown plant characteristics. An operationally faster controller is also needed. Such a controller should preferably operate in real time to control a complex plant.

A controller system is needed that is known a priori to be trainable. Especially needed is a network controller that is reliably trainable. For example, a controller should be trainable in conditions outside the domain of previous training.

It would be beneficial for a system to be trainable within a pre-determinable amount of time, or at least within some time limit. Optimization of training should also be universal, to minimize the training time of the system. As a practical matter, a controller is needed that is not only operable in real time but trainable in real time. This includes control of a plant of sufficient complexity to be of use in many industrial and aerospace applications.

In summary, a controller is needed that does not require complete knowledge of the controlling differential equations for operation of a plant, and yet can utilize whatever knowledge is known concerning the plant. For example, a controller is needed that can utilize the form of a classical controlling equation, without requiring that the equation's coefficients being known.

A network controller that is trustworthy, stable, and reliable during training and operation is needed. That is, neural networks are not trustworthy, in that they are only reliably trained to perform over the range and domain in which they are successfully trained. Moreover, they might not train at all. Whether one will train is not known in advance. Also, training may occur yet take an inordinate amount of time.

By contrast, what is needed is a trainable network controller that is stable over all ranges specified in advance. A system is needed that can implement some form of a control law, yet inherently limit a set of control weights to a proper form and order and linearly combine them to achieve a result that is stable.

BRIEF SUMMARY AND OBJECTS OF THE INVENTION

In view of the foregoing, it is a primary object of the present invention to improve the speed of "learning" by an adaptive control system sufficiently that learning may occur in real time.

It is an object of the invention to minimize the numbers of saved points in state space required by the controller.

It is an object of the invention to provide the best weights and obtain an optimal output from the controller as an input for a controlled plant.

It is an object of the invention to provide an optimal output from a controller as an input for the controlled plant, in response to the output of the plant fed back to the controller.

It is another object of the invention to provide an apparatus using sensors connected to a plant for sensing outputs of the plant to be controlled using a table of weights corresponding to state variables reflecting the outputs sampled at discrete locations in a range of a state space over which a form of a control law is operative.

It is another object of the invention to provide a form of the foregoing control law represented by a matrix equation in terms of state variables having unknown coefficients, and constituting a transformation into the state space of a form of a mathematical description of the plant.

It is another object of the invention to provide a processor programmed to provide the foregoing unknown coefficients by interpolating the table of weights with an interpolation function, to solve the matrix equation, and to provide a control output reflecting a solution to the matrix equation.

It is another object of the invention to provide such a foregoing apparatus wherein the interpolation function is an ideal interpolation function.

It is another object of the invention to provide an interpolation function having a frequency in a dimension of the state space higher than a frequency of the control law in the dimension.

It is another object of the invention to provide the frequency of the interpolation to be higher than the highest significant frequency of the control law il the dimension.

It is another object of the invention to provide the table of weights, determined by optimization.

It is another object of the invention to provide such a table of weights determined by optimization of a cost function.

It is another object of the invention to provide the table of weights by sampling an output of the plant corresponding to a plurality of states in the state space.

It is another object of the invention to provide, in the table of weights, values determined at a frequency in a dimension of the state space corresponding to an optimized distance with respect to a frequency of the form of the control law in the dimension.

It is another object of the invention to provide a training computer for providing the table of weights.

It is another object of the invention to provide, in such computer, a processor for calculating the table of weights from the outputs of the plant.

It is another object of the invention to provide such a processor programmed to provide the table of weights using an optimization process.

It is another object of the invention to provide an optimization process that operates to minimize a cost function.

It is another object of the invention to provide an apparatus as described, wherein the transformation utilizes a system of linear equations representing a mathematical description of the plant in a set of nonlinear governing equations.

It is another object of the invention to provide such an apparatus having a plant selected from a group that includes a guidance system; navigation system; attitude control system; propulsion system; automotive system; process control system; machine control system; robotic system; manufacturing line control system; inventory management system; storage and retrieval system; image processing system; space heating, ventilating, and air conditioning system; and biological process management system.

It is another object of the invention to provide a method for controlling a plant by connecting sensors to the plant for sensing outputs corresponding to components comprising the plant, using reduced information as compared to classical control methods, and operating faster on a smaller computer than neural networks and other trainable control systems.

It is another object of the invention to provide a form of mathematical description for the plant, using a differential equation in at least one variable having an unknown first coefficient, the variable corresponding to an output of the outputs of the plant.

It is another object of the invention to provide a method for transforming the foregoing mathematical description into a form of a control law operative in a state space where a dimension of the state space comprises at least one variable, the form of the control law comprising a vector equation in the state space, and the vector equation has at least one unknown second coefficient selected to be determinable from a set of weights.

It is another object of the invention to provide a method for forming a table of weights corresponding to the output of the plant, sampled at discrete locations in a range of the state space.

It is another object of the invention to provide an interpolation function for interpolating the foregoing table of weights.

It is another object of the invention to provide a method for solving the foregoing vector equation for a control output, using values of the weights, provided by the interpolation function interpolating the table of weights.

It is another object of the invention to provide to the plant a control signal corresponding to a control output determined using a classical control law of unknown coefficients, particularly where the control law is linear, and more particularly in those cases where the interpolation of weights may be completed over the entire range of a state space over which the control law is applied by a user.

It is another object of the invention to provide such foregoing methods wherein an interpolation function corresponds to a mathematically ideal interpolation.

It is another object of the invention to provide such foregoing methods wherein a sampling frequency is determined from a frequency of the control law in the state space.

It is another object of the invention to provide such foregoing methods where a plant to be controlled by the method may be selected from guidance systems; navigation systems; attitude control systems; propulsion systems; automotive systems; process control systems; machine control systems; robotic systems; manufacturing line control systems; inventory management systems; storage and retrieval systems; image processing systems; space heating, ventilating, and air conditioning systems; and biological process management systems.

Consistent with the foregoing objects, and in accordance with the invention as embodied and broadly described herein, an apparatus and method are disclosed in one embodiment of the present invention as including a state-sampled, linear, network controller.

The system may be referred to as a trainable state-sampled network controller (TSSNC), a state-sampled network controller (SSNC), a state-sampled network (SSN), or simply a state-sampled controller (SSC). The system, by whatever name, may serve as a "controller." The system operates by reliance upon a classical control function of known form and order, but unknown coefficients. That is, a plant is to be controlled by a controller, and the plant may be represented by a characteristic differential equation 3expressible in terms of known variables (parameters) of known order, but unknown coefficients.

A control law function is sampled at a discrete number of points. Samples provide weights recorded in a table of weighting functions. The weights are optimized during training. The table of weights then provides samples of the optimal control function which when combined by the proper interpolation function yields the signal used to control a plant connected to the output of the controller.

Weights may be thought of as samples of the calculated dependent variable of a multi-dimensional state space of the control law in multiple independent variables. The weights are stored in a look-up table and are interpolated for any intermediate point in state space. Thus, weights are samples of the control function (control law) in state space.

The weights may also be thought of as the contribution matrix corresponding to the contributions by each element of the plant (each variable of the control function) to the coefficients of the governing differential equation (control function, control law).

Each dimension of state space corresponds to one of the variables in the control law. A table of weights is created by the control network during the "learning" process. The table may be optimized with a cost function. The table may then be interpolated to obtain values of the control function at points in state space intermediate the sampled locations. However, interpolation is both accurate and rapid, and may even be made exact by use of an interpolation function of proper degree.

A plant having a sensible output (for providing feedback) may be connected to a linear network, providing a controlling input signal. The controller may include a loop for control, and another loop for optimization of the weights of the controller. The optimization loop may be used to train the system to an optimized set of weights. The optimization system for training the state-sampled network of the invention may rely on any linear system optimization method.

For a large class of applications, the control surface (the surface in state space defining the value of the control function) is reasonably smooth, having a low spatial frequency of the state control function. Thus, the invention may rely on uniform (in a frequency or spectral domain) sampling to establish the weight table. The invention requires far fewer weights, with interpolation functions of a degree high enough to interpolate the control function exactly. Thus, the result may be as accurate as if an actual Nyquist function of the system were being evaluated in a closed form solution.

In contrast to neural network controllers, an apparatus and method in accordance with the invention may be made stable over all ranges specified in advance. The control law may limit the weights to the proper form and order. The equation or equations corresponding to the control law will linearly combine the weights contributing to coefficients to achieve a result that is also stable.

A trainable, state-sampled network controller requires less memory, trains faster, and provides generalization based on 1 spectral analysis of a desired control law as a function of state variables. The TSSNC may be trained with supervised learning techniques or on-line adaptive algorithms. Classical mathematical methods such as quadratic cost functions may be used to define optimum results, and may be easily incorporated into design procedures.

The network, as shown by classical sampling theory, is of minimum size, requiring only the number of weights needed to match the dynamic response of the control law selected. The control law may be selected based upon the form of a generalized, governing, differential equation of unknown coefficients. Orders of magnitude fewer computational iterations are required for training and operating a TSSNC than either a neural network or a CMAC controller.

An apparatus and method in accordance with the invention may be implemented on a relatively small computer, including a personal computer and even a microcontroller, comprising a processor chip (i.e. 8-bit processor) provided with its own integral memory registers, typically 256K or fewer bytes. The TSSNC may control complex systems in real time by use of an ideal interpolation function interpolating between a limited number of weights within a state space array of state variables.

The invention uses fewer points than CMAC or neural networks. Moreover, whereas a neural network may take hours or days to train, and the CMAC may take several minutes, the invention operates in seconds or fractions of a second to train, and can even be optimized in seconds for an equivalent system, of equivalent complexity, controlled to an equivalent degree as compared with a CMAC or neural network system.

Control applications may include guidance, mechanical stabilization and control, robotics, autonomous navigation of land or air vehicles, image recognition in industrial or military applications, modelling, and adaptive control. The TSSNC may also be used to control biological systems or environments using classical mathematical forms of description for any measurable phenomenon of interest in such systems.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 21, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Figure 1:
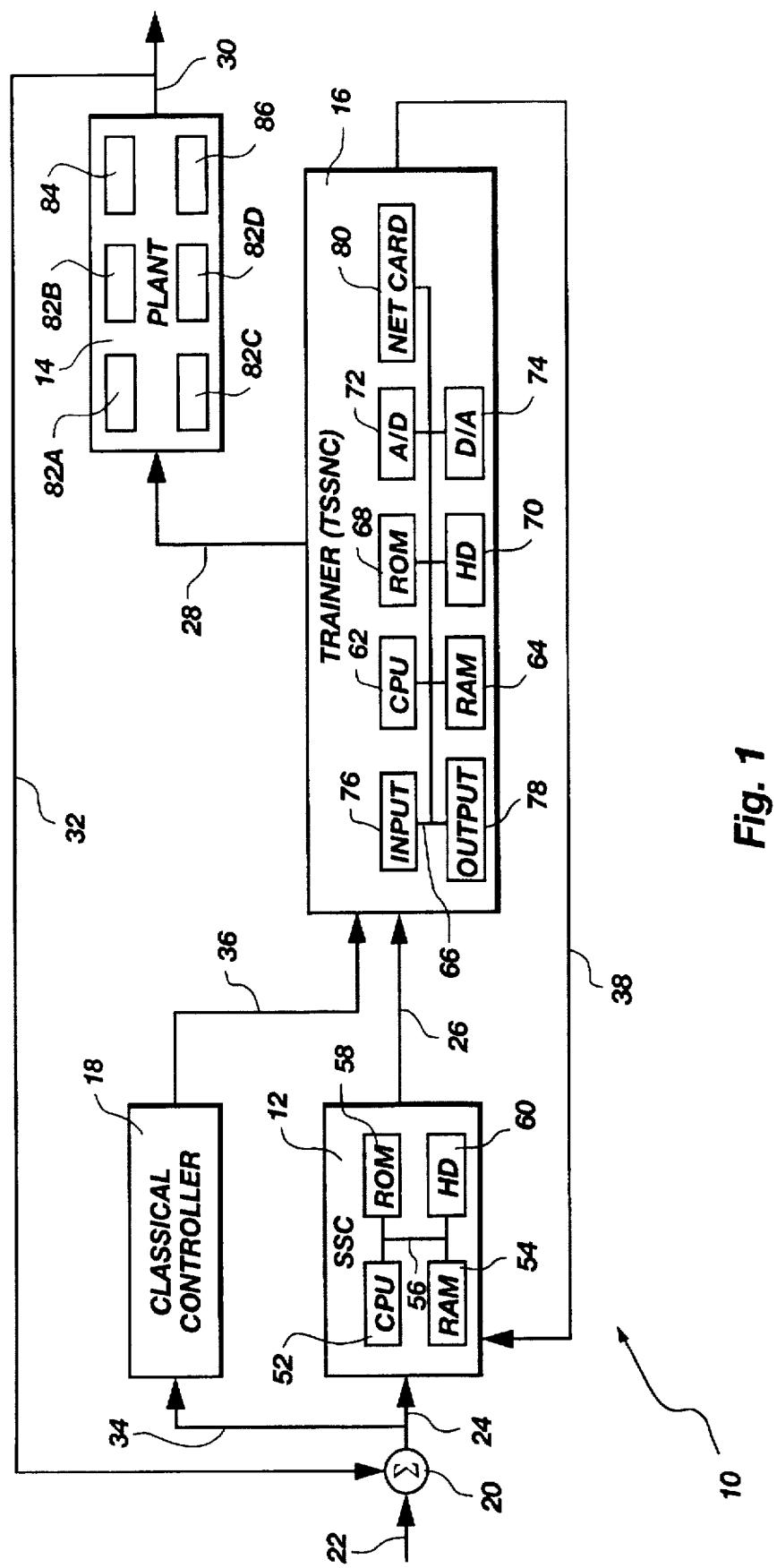
FIG. 1 is a schematic block diagram of an apparatus made in accordance with the invention.
Figure 2:
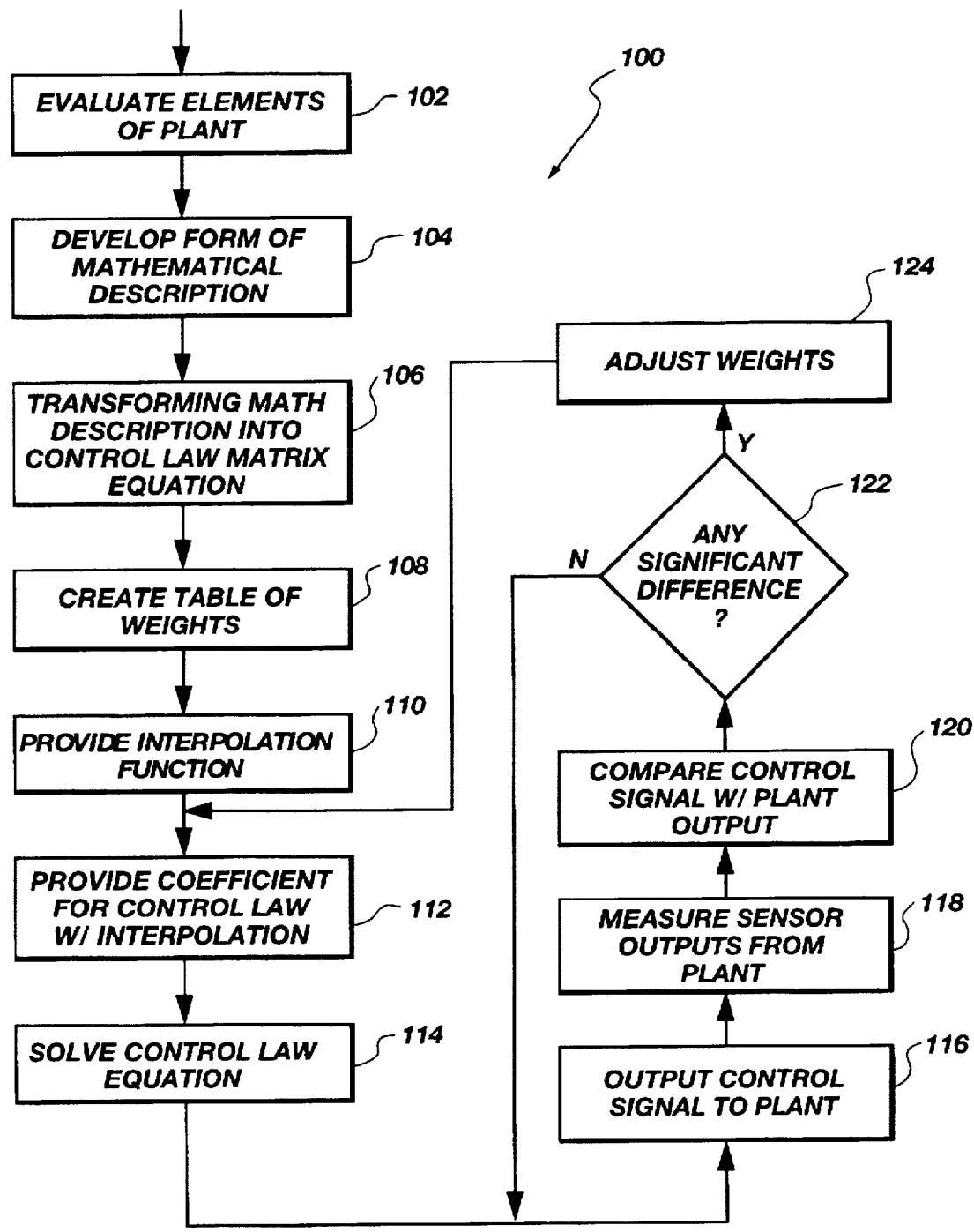
FIG. 2 is a schematic block diagram of a method implemented in accordance with the invention.

Referring to FIGS. 1-2, illustrated in some detail are schematic diagrams of one preferred embodiment of an apparatus and method practiced in accordance with the invention. Those of ordinary skill in the art will, of course, appreciate that various modifications to the detailed schematic diagram of FIGS. 1-2 may easily be made without departing from the essential characteristics of the invention, as described in connection with the block diagrams of Figures above.

Thus, the following description of the detailed schematic diagrams of FIGS. 3-21 are intended only as examples. These Figures simply illustrate certain presently preferred embodiments of apparatus and methods consistent with the foregoing description of FIGS. 1-2 and the invention as claimed herein.

From the above discussion, it will be appreciated that the present invention provides a trainable, state-sampled, network with wide applicability as a controller. An apparatus and method practiced in accordance with the invention may include a trainable network controller that is stable over all ranges specified in advance. Such a system can implement some form of a control law, yet inherently limits a set of control weights to a proper form and order and linearly combines them to achieve a result that is stable, rapidly calculable in real time. An apparatus and method practiced in accordance with the invention may be trained in real time, may be trained in virtually every instance, and may be operated in real time by computers of very modest capacity.

Prior art networks often assume that control functions that are close to one another within a domain will behave similarly, without so stating, without so proving, and without means for so assuring. It is not recognized in the prior art that control functions must have a sufficient degree of "smoothness," or that the smoothness can be characterized and quantified in the frequency domain of a state space, where a state space is the space of vectors comprising all values of the state variables. State variables are those terms or expressions of variables and their various orders of derivatives that appear in the controlling differential equations for a plant to be controlled by a control law.

A control law can be formulated as an equation in state space corresponding to the solution of the governing differential equations of a plant to be controlled. This multidimensional equation, if band-limited, can be expressed as a multidimensional Fourier series. The Fourier-series coefficients correspond to amplitude and phase components of the control function in 'state-frequency space'.

In using bandwidth and spectral properties of control functions, the spatial frequency, rather than the time frequency, is used. Thus, spatial frequency is a frequency in terms of radian changes per unit of state distance in state space. An angular frequency omega is a frequency in terms of radians of change per unit of state distance, whereas a frequency f would be a number of cycles per unit of distance in a state space.

Spectral properties for a function, such as an image function in a frequency domain, may be expressed as a multi-dimensional (two-dimensional) Fourier transform of the function (image function) in a spatial domain. The notation and schematics of such equations may be found in A. K. Jain, *Fundamentals of Digital Image Processing*, Inglewood Cliffs, N.J., Prentice Hall, 1989. In an apparatus and method in accordance with the invention, a control law written as a function of state variables (variables in multidimensional state space) may be viewed as a multidimensional image function $u(X)$, where X is the vector of state variables.

The spectrum of the multi-dimensional function of state may be given by a multi-dimensional Fourier transform $U(\omega)$. In the foregoing expression, $\omega$ is a vector of spatial frequencies in state space representing the changes in the function with respect to spatial distances or changes in state. The Fourier transform of a function of state may be referred to as a "state frequency function" or a "state spectrum" where ω is in units of radians per unit of distance in state space.

The existence of integrals required for the Fourier transform above will exist if certain sufficient, but not necessary, conditions are met. Some of these conditions include the Dirichlet conditions, which may include the restriction that the function, u(X), has a finite number of finite discontinuities, has a finite number of maxima and minima, and is absolutely integrable.

Moreover, another sufficient condition for the existence of a Fourier transform is if u(X) has finite energy, a function of the square of the function u(X). An example of such a function is a multi-dimensional sinc function (sin(X)/X). Such a function does not satisfy the Dirichlet conditions, but is square integrable and has a Fourier transform that is rectangular in shape.

The existence of a multi-dimensional Fourier transform provides certain useful properties, including uniqueness for continuous functions u(X) and U(ω), separability of the control function, linearity (sum of transform=transform of sum), and conservation of energy between the spatial and frequency domains. This last relationship is Parseval's relationship extended to multi-dimensional transforms.

Other useful transforms that may be used in an apparatus and method in accordance with the invention include the multi-dimensional Dirac delta function, for obtaining the transform for a constant function and a host of other common functions with infinite energies. For example, multi-dimensional sine, cosine, unit step, signum, and ramp functions exist and may be derived.

In the prior art, developers of networks presumed certain suitable behaviors for a control function. Developers did not know how to define a priori, with any rigor, what "suitable" meant. They did not teach how suitability could be insured, or identify factors on which it depended.

In an apparatus and method in accordance with the invention, the convergence of a Fourier integral or an arbitrary multi-dimensional function may be assured by assuring that the control function has finite energy (finite integral over the domain of the state space), indicating that the Fourier transform of a control law exists if the control law is bounded in amplitude over a finite range of allowable state values.

A control law that is sufficiently "low in spatial frequency" may thus be well behaved. To be low in spatial frequency means that a control law as a function of state has a smooth curvature over the region of support in state space. One may view smoothness in terms of limited numbers of variations or inflection points in a surface of interest in a space. For example, to find a surface or curve to be smooth, a sample should contain limited numbers of inflection points, maxima, an minima. These might be limited according to the degree of a polynomial fitting the function, for example, according to interpolation theory. Thus, no unrepresented ripples (maxima/minima) would be found within a step size of a discretized grid of the domain of interest, for example.

Evaluation of the spectral properties of control functions may be obtained by examining those of "controllability canonical form." One procedure for designing a control law for such a plant is to use the method of "perfect cancellation," in which the control law is rewritten in a matrix form in which the right hand side vector is a zero vector. Such a result is independent of the technique incorporated for whether or not system elements are linear, continuous, discreet, stable, or even mathematically describable.

One may think of a control function, bu, that is equal to f(X)−g(X), where bu is a summation of the original plant dynamics, f(X), and the negative of the desired dynamics of the control system, −g(X). The Fourier transformation of the f(X) and g(X) functions may be combined by superposition to find the state frequency of a drive signal.

If both the functions f and g are low in bandwidth, or at least band limited, the control function bu will be low in bandwidth or at least band limited. Even if Fourier transforms do not exist for these functions, the sum of two "low pass" spectra is always low pass.

Referring now to FIG. 1, an apparatus 10 may be configured to use a trainable state sampled network controller 12 or state sampled controller 12 for controlling a plant 14. A trainer 16 may be placed between the SSC 12 and plant 14 temporarily or permanently.

A controller 18, in one embodiment, a classical controller 18, may be connected in parallel with the SSC 12 for training purposes. In one embodiment, the trainer 16 may be the only computer used as an SSC 12. However, the requirements on a trainer 16 are greater than those for an SSC. Therefore, in the embodiment as illustrated, the trainer 16 may be removed after training, as may the classical controller 18.

A summing device 20 may accept a signal 22 corresponding to desired performance of the plant 14, and a signal 32 corresponding to outputs 30 of the plant 14. The summing device 20 may then provide a signal 24 as an input to the SSC 12, based upon the signals 22, 32 received as inputs.

The SSC 12 may provide a signal 26 as an input to the trainer 16. The trainer 16 may provide a signal 28 as an input to the plant 14. Meanwhile, the plant 14 may provide an output 30 sensed and forwarded to the summing device 20 through a signal 32.

A signal 34 corresponding to the signal 24 may be provided as an input to the controller 18. The controller 18 may then provide a signal 36 to the trainer 16 during training. Thus, the controller 18 may provide some bounding of the signals 28, 36 during training.

An SSC may include a central processing unit, (CPU) 52 of various configurations. In one embodiment, the CPU 52 may be a simple 8-bit processor with a minimum memory device 54 or Random-Access Memory (RAM) 54 resident on the same chip as the CPU 52. In one embodiment, a bus 56 may connect the CPU 52 and RAM 54, as well as optional Read-Only memory (ROM) 58 and hard drive 60 or other non-volatile storage 60. In one embodiment, only the CPU 52 and memory 54 are necessary for an SSC to operate, after training.

A trainer 16 may include a CPU 62 and a memory device 64, typically Random-Access Memory (RAM) 64. Since a trainer 16 may require more storage than an SSC 12, certain programming functions, data, and the like may be stored in a Read-Only Memory (ROM) 68 connected to the CPU 62 and RAM 64 by a bus 66. Mass storage 70, such as a hard drive 70, may also be connected to the bus 66.

Analog-to-Digital converters 72 and Digital-to-Analog converters 74 may be located remotely from the trainer 16. In an alternative embodiment, a trainer 16 may include the converters 72, 74 within the architecture of the trainer 16, itself. In an alternative embodiment, the converter 72, 74 may be located remotely close to a plant 14. The converter 72, 74 may also be provided with other computational support, such as a computer for processing data, and thus return only data to the trainer 16 suitable for using in a table of weights.

Other input devices 76 and output devices 78 may be provided for the trainer 16. The input 76 and output 78 devices may provide interfaces to a user, a programmer, or other devices. In one embodiment, a network card 80 may provide an interface to a network. That is, the trainer 16, SSC 12, controller 18, and plant 14 may be connected over a network. Any or all of those devices 12, 14, 16, 18 may include a network card 80 for remote communication, training, operation, and the like.

A plant 14 may include several structural or operational elements 82A, 82B, 82C, 82D. The plant 14 may also be provided with sensors 84 and sensors 86 for sensing the response of any or all of the elements 82. Thus, the sensors 84, 86 may provide the signal 32 or signals 32 reflecting the output 30 of the plant 14.

Referring now to FIG. 2, a process 100 may train and operate an SSC 12. An evaluation 102 may evaluate elements of a plant to determine the nature of "form" of any element 82A, 82B, 82C, 82D of the plant 14.

After the evaluation 102, a description 104 may be conducted. The description 104 may include development of a form of a mathematical description of a plant 14. For example, each of the elements 82 may have certain characteristics that, although not known, may be well understood as to their nature. Thus, a form of a mathematical equation of unknown coefficients may develop during the description 104. Typically, the description 104 may include development of differential equations of various orders, and various parameters reflecting the elements 82 of the plant 14.

The transformation 106 may include various types of transformations. For example, Fourier transforms may be used to provide transformations of certain forms of mathematical descriptions or equations from the description step 104. Certain transforms may be used to provide linear systems of equations in state variables, representing the forms of differential equations developed in the description 104. In one embodiment, the transformation 106 may result in a matrix equation representing a control law. The matrix equation may be completely linear. That is, the matrix equation would obey the rules of linear algebra for manipulation and solution. Likewise, no variable in a linear equation is combined with any other variable, except in an additive or subtractive expression.

The table 108 step may include several internal steps as well. For example, the table 108 step represents the creation of a table of weights. The table of weights determines coefficients in the matrix equation of the transformation 106. Of course, the table of weights, thus, also reflects the coefficients of equations developed during the description 104. In one embodiment, outputs of a plant 14 may be used as a specific example of the equations of the transformation 106. Thus, such an output of the plant 14 would reflect one actual solution. Thus, a table of weights may be prepared reflecting the matrix of coefficients from the variables of the matrix equations developed in the transformation 106.

The interpolation function step 110 requires provision of an interpolation function for the table of weights of the table step 108. That is, in an apparatus and method in accordance with the invention, a limited number of weights may be used. However, it is desired to provide interpolation of weights over the entire range of interest or the performance of a plant 14. Thus, each row in the matrix equation of the step 106 may be regarded as a linear equation in several variables. The coefficients for the state variables can be determined by physical law or empirical analysis per step 110.

That is, the interpolation step 112 relies on a set of interpolation functions 110. The interpolation functions from the interpolation function 110 may be used to form coefficients for each variable. All contributions of all variables in the matrix equations of the step 106 may be used. Thus, each interpolation function from the interpolation function step 110 may be used in some combination to provide the influence of each of the weights of the step 108 to each of the coefficients of the matrix equation of the step 106. Thus, the interpolation step 112 actually may provide the formerly unknown coefficients for the matrix equation of the step 106.

The solution step 114 may then solve the matrix equation 106, now provided with the coefficients from the step 112 to determine a signal 28 for controlling the plant 14. As a practical matter, certain methods may be used that combine the steps 112, 114. That is, certain linear system solvers provide coefficients and a solution in a single procedure that alternates between finding coefficients and solving equations.

The output step 116 may provide an output control signal to a plant. In a training situation, a trainer 16 may provide a signal 28 to the plant 14. In a system that has already been trained, a trainer 16 may be absent, and a training controller 18 may also be absent. Thus, a signal 26 may become directly a signal 28 to a plant 14. Nevertheless, an output control signal may be provided to a plant 14 in an output step 116.

Sensor outputs may be measured in a measurement step 118. That is, an output 30 from a plant 14 may involve several variables sensed by sensors 84, 86. Thus, an output 30, or numerous outputs 30, may be sensed and measured by the measurement step 118.

A compare step 120 may be conducted by a comparator 20 or summing device 20. The comparator 20 may compare a signal 32 reflecting the output 30 of a plant 14, and compare it with a signal 22 indicating a desired value of the signal 32.

A decision 122 may next determine whether any significant or undesired amount of difference exists between the signals 22, 32. If not, the process 100 may return to the output step 116 continuing to the comparison 120.

In certain circumstances, such as during training, and also in the event of ongoing training, additional steps 124 may be added. For example, the adjust step 124 may adjust the weights in the table of weights originally created during the table step 108.

With new, adjusted weights, the process 100 may then advance to the interpolation step 112. Thus, the adjusted weights from the adjust step 124 may replace the original weights provided in the table step 108.

Figure 3:
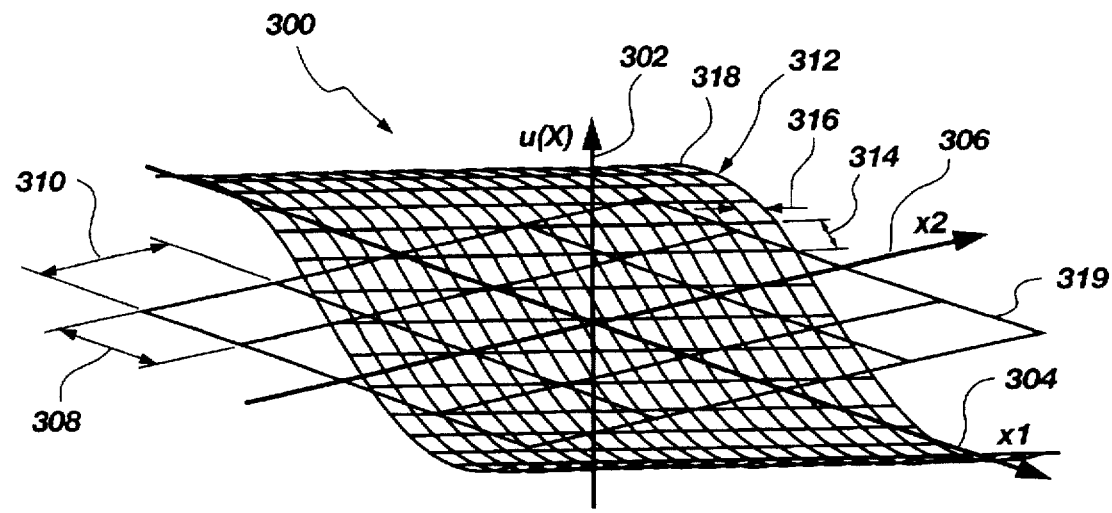
FIG. 3 is a schematic image of a nonlinear control function U(X) in a three dimensional state space X of two independent state variables x1 and x2.

A control function u(X) may be nonlinear, as illustrated in FIG. 3. Even though such a nonlinear control function is a smooth function of the state variables $x_1$ and $x_2$, the spatial spectrum of the transformed control function is showing the low bandwidth in that only relatively low frequency component (compared to the grid size in the state space) appear. Such band limiting may be obtained when a sampling size, grid size, or step size within the state space, is selected at a frequency (in state space) higher than the frequency of the control function u(X).

In a method and apparatus in accordance with the invention, multi-dimensional sampling theory may be used in combination with the theory of control functions to determine a sampling rate in state space (the state domain) for the control law. That is, control laws are often composed of functions of several variables of state and multiple inputs. A set point controller having two state variables, such as position and velocity, for example, may illustrate. For any unique state and input, a single vector value of control output will exist.

Figure 4:
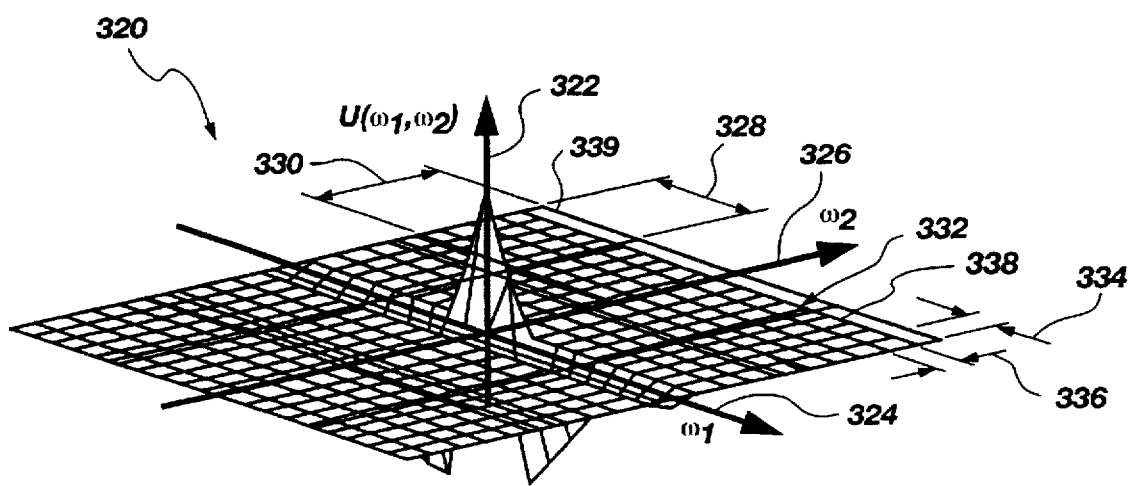
FIG. 4 is a schematic image of the transformed control function U($\omega$1, $\omega$2), the spatial spectrum of the nonlinear control function U(X) of FIG. 3.

Referring now to FIG. 4, a control function 320 in a transformed state space may be determined as illustrated. The control function axis 322 or U axis designates any measurement of a value of a control function 320. The space over which the U ($\omega_1$, $\omega_2$) is defined as variables $\omega_1$ along the $\omega_1$ axis 324 and the $w_2$ axis 326. The two axes 324, 326 define the range.

Referring to FIG. 4, the increment 328 and increment 330, along a control surface 332 in a spatial spectrum, extend over the range of the axes 324, 326, defining the incremental step size or frequency that may be defined within the range. The increments 334, 336 identify the step size, increment, or frequency of resolution of the control function 320 as described by the control function grid 338. Thus, the control function grid 338 and the range grid 339 illustrate schematically surfaces in their respective spaces. For purposes of illustration, the increments 334, 336 and 328, 330 may be picked for convenience. In actual calculations during operation of an apparatus 10 or process 100, discrete values of any control function 320 may be selected at a selected spacial frequency, which may be envisioned as the grids 338 and 339.

Figure 5:
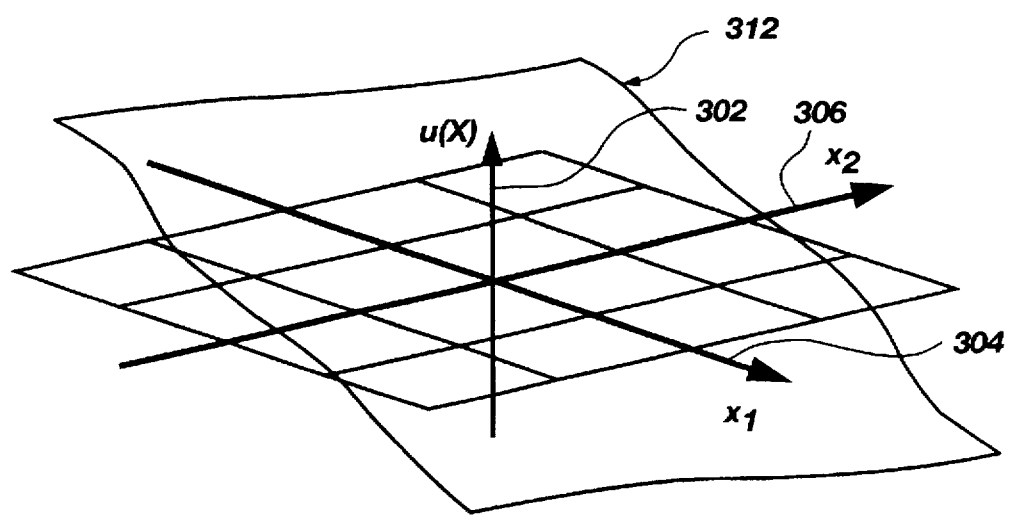
FIG. 5 is a schematic image of a continuous control surface as a function of state variables in a state space.

Referring to FIG. 5, a control function of two variables is shown. A plot of the control function may be thought of as a "control surface," shown in FIG. 5 as a mesh or grid.

Figure 6:
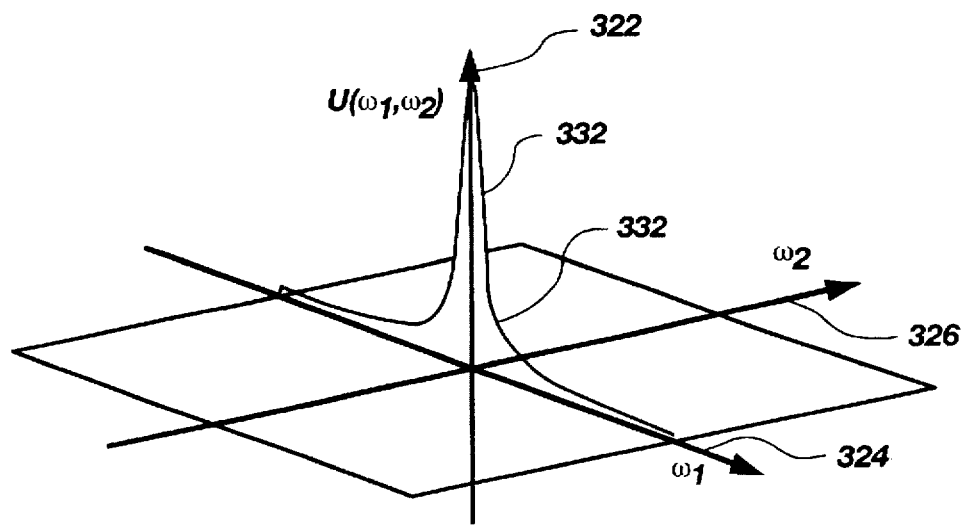
FIG. 6 is a schematic image of the frequency components of the continuous control surface of FIG. 3.

Referring to FIG. 6, a two-dimensional Fourier transform of the control surface may yield the spectral plot illustrated. Low frequency components are located near the center of the surface. Higher frequency components are located toward the outside edges.

Figure 7:
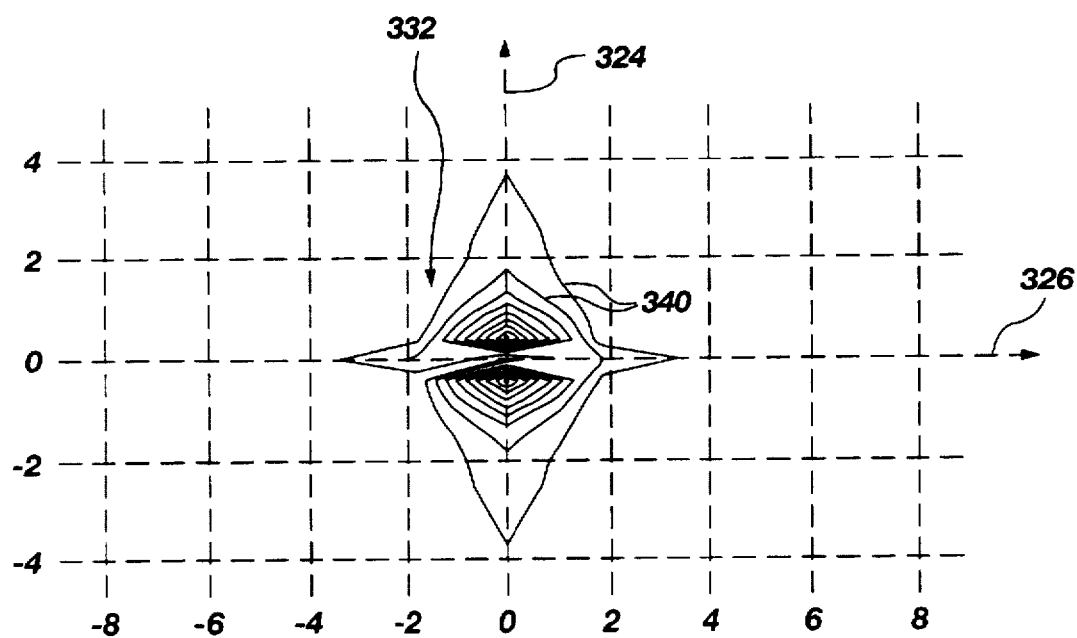
FIG. 7 is a schematic image of a contour map of spatial frequencies of the control surface of FIG. 5.

Referring to FIG. 7, a contour or plan view may represent the function of FIG. 6. FIG. 7 shows the same spectral plot as FIG. 6 with each contour 340 as an iso-valued locus.

Figure 8:
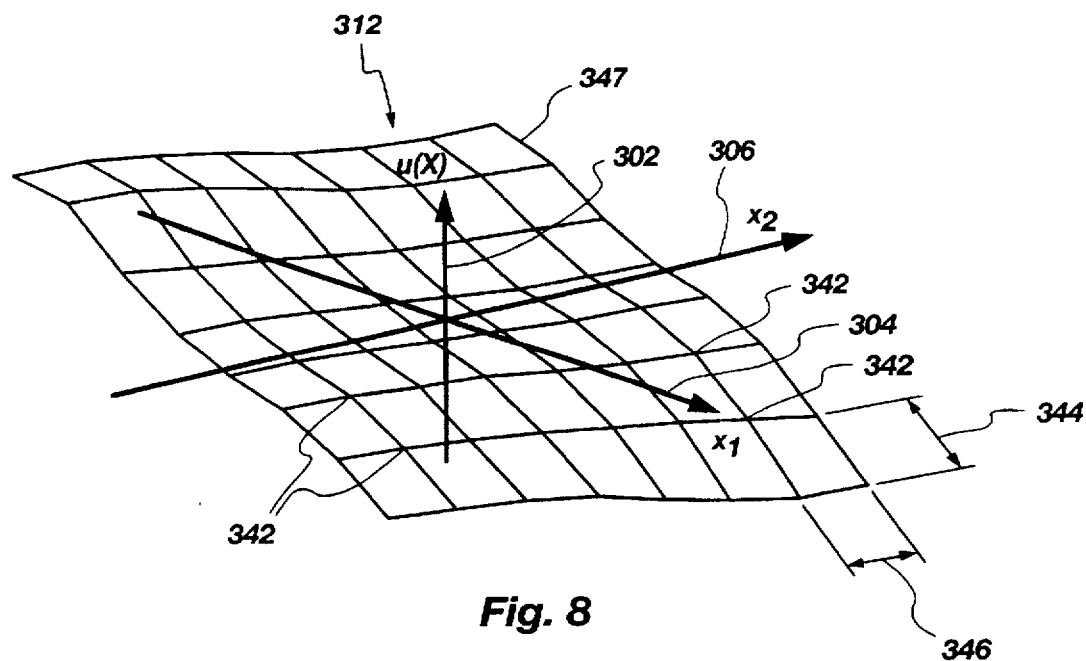
FIGS. 8 and 9 are schematic images of a discretely sampled control surface.
Figure 9:
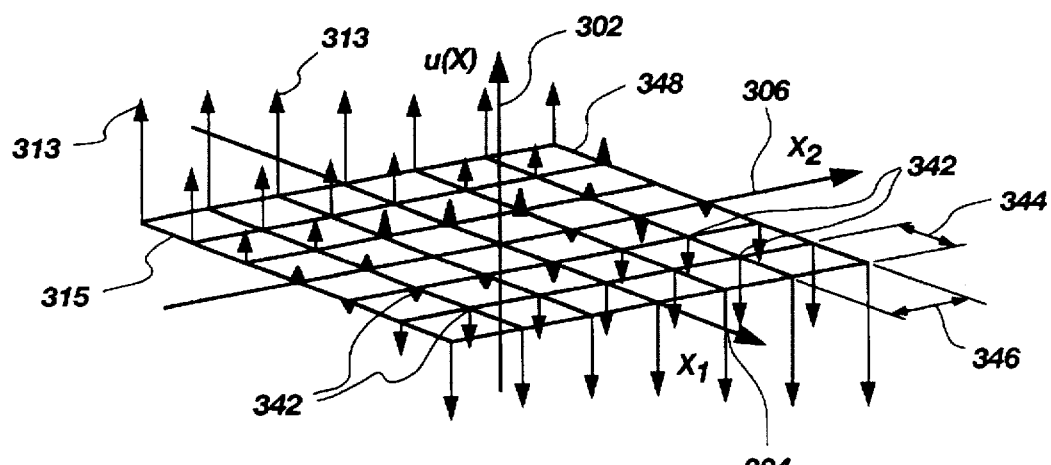

Referring to FIGS. 8 and 9, in an apparatus and method practiced according to the invention, sampling theory may be relied upon. One may sample such functions having low spatial bandwidth at a relatively few sampling points 342, represented by intersections 342, without loss of information. The surface 312 may be sampled at selected step sizes 344, 346, in x1 and x2, respectively. The surface 312 may thus be represented or approximated by the grid 347, a discrete control surface 347. Each intersection 342 of grid lines corresponds to a sampling point 342 and a corresponding value of the function u(X) 300 along the functional axis 302 at that intersection 342.

Referring to FIG. 8, the samples or the sampled control law may be referred to as a "discrete control surface," 347 defined by samples taken from the continuous control surface 312 illustrated in FIG. 5. Thus, even though the surface 312 is not actually the control surface 347, one may think of the discrete control surface 347 as representing the control surface 312.

Mathematically, the discrete control surface 347 may be defined as a product summation involving the values 313 of the continuous control function 300 (along a surface 312) at each sampling location 342.

Sampling is at increments 314, 316 along a grid 318 of the function 300, whereas a grid 319 is in the state space in FIG. 3. To form the summation of products, each value 313 may be multiplied with a two dimensional array of Dirac delta functions on the rectangular grid 315 of FIG. 9, having a spacing 344, 346 corresponding to the sampling locations as illustrated therein.

The original, continuous, control function 300 will be reflected in the characteristics of the sampled surface 347 of FIG. 8, including any optimal characteristics that may have been selected for the continuous non-linear control function 300 forming surface 312 of FIGS. 3 and 4. In general, the function 300 may be measured as a control surface 312 varying along a function axis 302 over a range defined by the range axes 304, 306 as shown in FIGS. 3, 5, 8, and 9. The increments 308, 310 correspond to distances along the respective axes 304, 306.

The selection of the number of samples, and the spatial sampling interval 308, 310 within the control space or control state space 319, may be estimated by spectral analysis of existing control functions for a plant of interest. One approach in determining sampling rates is to incorporate an iterative trial-and-error method. Thereafter, sampling rates may be increased until no improvement in results is noted. This is similar to finding the order of an ARMA model using dynamic data analysis.

Referring to FIGS. 8 and 9 The effect of a discrete control surface, as illustrated in FIG. 5, is to store the control law in relatively few memory locations. To define a value of a control signal at any point in state space, a value must be determinable. In an apparatus and method practiced according to the invention, the controller may interpolate between each sampled state. An ideal interpolation function may be selected.

In accordance with the invention, the ideal interpolation function may be defined by a sinc function (sin(X)/X). Actual control signals may be realized by interpolation of a discrete control function with a multi-dimensional sinc function based on the sampling specifications for each state variable. For details relating to sampling theory, such as assuring stability of interpolated functions, one may refer to B. C. Kuo, *Digital Control Systems*, New York, Holt, Rhinehart, and Winston, 1980. A multi-dimensional sinc function may be defined as a product of sinc functions in all the dimension of a state space.

In general, all linear control laws, and a wide variety of nonlinear control laws, may be shown to be band-limited in nature when viewed in the state domain. Due to the relatively low frequency characteristics, compared to the sampling grid size in state space, a large class of control functions may be sampled at relatively few state values, and re-interpolated later, without loss of information or detail. An interpolation function or filter of the form of a sinc function may be used for reconstruction of sampled functions.

THE STATE-SAMPLED CONTROLLER

The state-sampled controller, a state-sampled network used as a controller, combines several of the best properties of a CMAC network, classical controllers, mathematical rigor, ideal interpolation theory, sampling theory, and digital signal processing theory. A trainable state-sampled controller may be configured to use a single layer of weights. Weights may be thought of as an array of constants, a matrix, defining the contribution of each input (a measurement of a state variable in a plant to be controlled) to the coefficient of each state variable in the controlling equation in order to determine the net output signal of a controller.

The trainable state-sampled network controller (TSSNC) relies on multidimensional, ideal, spatial sampling based on image processing theory to conduct training. By contrast, the CMAC network obeys the law of superposition and therefore can be trained using the gradient search method or a least means squares method, rather than back propagation. By avoiding the "hash" mapping techniques of CMAC, the TSSNC may also avoid many of the large memory requirements of CMAC systems.

The TSSNC may rely on optimization methodologies such as using a quadratic cost function from optimization theory, incorporated into the controller design methodology. The TSSNC may be used in a wide class of common linear and nonlinear control implications where the plant to be controlled is controllable, the control function is smooth and continuous over a finite region of support (state space), and the multi-dimensional Fourier transform analysis is valid, as described above.

A trainable state-sampled network controller (TSSNC), sometimes referred to as simply a state-sampled controller (SSC), may be designed to execute band limited control functions over a finite region of state values (state space). An SSC network may be made up of a multi-dimensional matrix of samples, each dimension devoted to one state variable or axis in state space. The samples correspond to the control law. The control law may be thought of as a function "u", where $u(p,q,\Delta x_1, \Delta x_2) = \Sigma\Sigma u(p\Delta x_1, q\Delta x_2)\delta(x_1 - m\Delta x_1, x_2 - n\Delta x_2)$, summed over all m, and n, from $-\infty$ to $\infty$ The control law is the transformed law developed from the governing differential equations. Thus, the samples correspond to sample values of the control law, which may be interpolated through the multi-dimensional sinc function. The samples of the control law form the weights of the network (TSSNC, SSNC SSC), while the interpolation function forms the interconnections and creates generalization.

Mathematically, a network may be described by u(X), where $u(x_1, x_2, \ldots, x_z) = \Sigma(\sin(x_1-n)/x_1-n)(\sin(x_2-m)/x_2-m)\ldots(\sin(x_q-z)/x_q-z)(n,m,\ldots,z)$ summed over n,m,to z, where U(n,m, . . . ,z) is the matrix of network weights. One may think of the mathematical form of the SSN visually. For a basic second order network, the network may be implemented as shown in a code segment as follows: u(x,y)=0; for n=5 to 5; for m=6 to 6; u(x,y)=u(x,y)+sin(x−n)/(x−n)*sin(y−m)/(y−m)*Weight(n,m); next m; next n.

This algorithm assumes two distinct variables (x and y) and an eleven-by-thirteen sampled control law stored in a matrix "Weight (n,m)." Higher ordered networks (TSSNC, SSNC, SSNC, SSC) require only additional nested for/next loops and additional product terms in the running summation.

Many networks have a complex interconnection of non-linearity masking underlying mathematical relationships. The SSC is not based on a complex architecture, but on the use of faster and more efficient training methods. A state-sampled network allows known methods of controller design, such as state-of-the-art optimization algorithms, to be incorporated directly into the training process. Such known methods may be very powerful.

One of the major improvements of a state-sampled network controller is that linearity and simple structure allow the use of advanced training methods, which would not be available with other types of controllers, even other network controllers. A typical plant and controller architecture using a state-sampled network as the controller is illustrated in FIG. 10.

Figure 10:
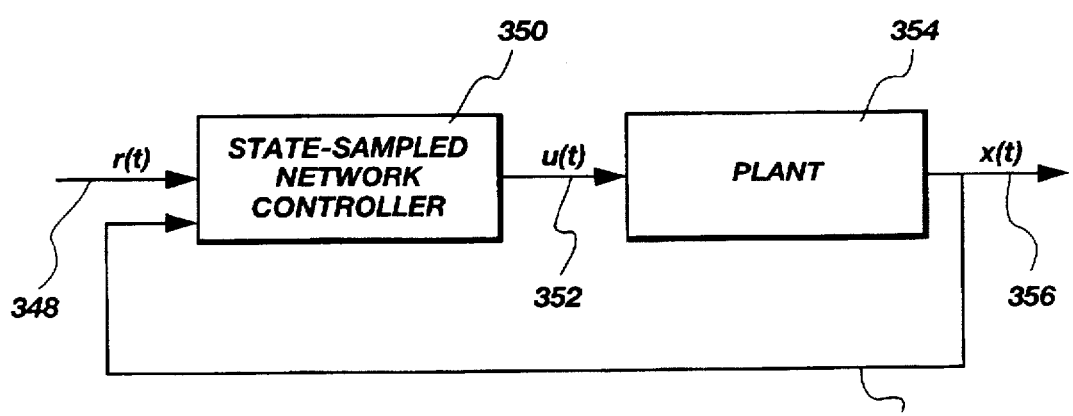
FIG. 10 is a schematic block diagram of a general control architecture for a trainable state-sampled network controller (TSSNC)

Referring to FIG. 10, a single input 348, r(t), to the SSC 350, single control signal 352, u(t), from the SSC 350 to the plant 354, single output 356, x(t), and state feedback 358, from the plant 354, are displayed. However, in general, a state-sampled controller may accommodate multiple reference inputs 348 and multiple state feedback 358 to produce multiple control signals 352. Inherent also the assumption that the plant is controllable. This assumption implies that a control function u(t) does exist that will drive the plant to a desired state in some finite period of time.

TRAINING THE NETWORK

Training a state-sampled controller may be accomplished with numerous techniques, many of which are documented in the prior art and in connectionist literature, especially those relating to CMAC training methodologies. In one embodiment of an apparatus and method in accordance with the invention, an existing control law may be translated. That is, where the controller is implemented in software, a classical controller creates control signals according to mathematical control laws.

In certain small computer applications, the extensive mathematical manipulation may be time consuming, and thus not render control possible in real time for an actual, physical system. In such cases, classical control algorithms may be replaced by network controllers trained to create the original control law relationships. That is, unlike neural networks, which are trained iteratively even when input/output relationships are known mathematically, a state-sampled network and its weight values may be determined through computation.

Initially, a suitable control law is determined through classical mathematical procedures. That is, the governing differential equations for the behavior of items of interest in the plant to be controlled, may be represented by appropriate mathematical expressions. These expressions may then be combined into a differential equation, and classical control theory may be used to develop the control law.

Next, the spectral properties of the control law are evaluated to ensure proper sampling and reconstruction. Next, the mathematical control law is sampled at various locations of state space, and the control outputs are stored. These sample control outputs become the weights used by the state-sampled controller.

Even the most mathematically intensive control algorithms may be calculated and sampled off-line and stored as weights in a memory device. A micro-controller of relatively modest performance may nevertheless perform the actual operation of interpolating the weights and adding them together to produce a control output in real time. The substantial savings in weight, volume, cost, and complexity may be substantial over other controllers of equivalent performance.

For example, a cantilevered pendulum, having the principal weight on top of a pendulum pivoted at a bottom end, was controlled by an SSC. The control law was derived mathematically from the plant dynamics to be:

$$u(t) = 2\omega(t)\dot{\omega}(t) + 10 \cos(\phi(t)) - 4\omega(t) - 9\phi(t).$$

A seven-by-seven sampling matrix of this function over the range of $\phi$ from $-\pi$ to $+\pi$ radians and the $\omega$ range from $-\pi$ to $+\pi$ radians per second was computed. The resulting weight matrix appears as:

$$u(\phi_n, \omega_m) = \begin{bmatrix} 11.1 & 17.9 & 17.9 & 18.3 & 18.7 & 16.3 & 25.4 \\ 6.7 & 13.5 & 13.5 & 13.8 & 14.2 & 11.9 & 21.0 \\ 7.3 & 14.0 & 14.0 & 14.4 & 14.8 & 12.4 & 21.6 \\ 2.8 & 9.6 & 9.6 & 10.0 & 10.4 & 8.0 & 17.2 \\ -11.6 & -4.8 & -4.8 & -4.4 & -4.0 & -6.4 & 2.7 \\ -31.0 & -24.2 & -24.2 & -23.8 & -23.4 & -25.8 & -16.7 \\ -45.4 & -38.7 & -38.7 & -38.3 & -37.9 & -40.3 & -31.1 \end{bmatrix}.$$

Referring again to FIG. 1, another control method may be called supervised training. Classical control methods require knowledge of plant dynamics. One major advantage of trainable networks as controllers is a reduced need to understand the plant controlled. Thus, for example, CMAC systems known in the art may be trained using steepest descent routines, or least mean squares algorithms based solely on input and output data. Neural networks are usually trained by computationally intensive back-propagation methods.

However, the TSSNC may be trained much more easily. In one embodiment, an on-line supervised learning method may be used. A simple classical controller such as a PID may be used to control the plant. The classical controller is adjusted to stabilize the plant during the first part of training. The SSC is placed in parallel with the classical controller as illustrated in FIG. 1.

A quadratic cost function may be used to determine the optimality of control and to update the weights of the SSC using a least mean squares or similar algorithm. At the beginning of training, weights are set to small random values, causing the output of the untrained network to be somewhat erratic. Therefore, the training algorithm may use drive signals from the classical controller to operate the plant, almost exclusively.

As training progresses, the state-sampled controller (SSC) output will become similar to the classical controller output. As sufficient data is fed back and used to modify the weights, the training algorithm may begin to use the output (drive) signal from the SSC more, and the classical controller signal less.

Eventually, the classical controller may be switched out of the signal path, and the SSC will operate the plant autonomously. Training may continue with minor changes in the weight values to minimize the cost function further, and produce an optimal controller. The trainer controller may be disconnected after the weights converge. In an alternative embodiment, the trainer controller may be left in the control loop to act as an adaptive mechanism for compensating future drift. The relatively few weights contained in the SSC, and the use of least mean squares algorithms, allow the SSC to train on-line in real time for many applications.

In an alternative embodiment, a sequential quadratic programming method may be used. Sequential quadratic programming methods (SQP) are among the most efficient algorithms for minimizing many nonlinear functions. Such a method may be used to predict future squared error using a quadratic approximation of a Lagrangian function. Basically, a cost function is used to find a value of u(n) that minimizes a cost function J(n) by difference or differential equations where J(n)=x(n+1)' Qx(n+1)+u(n)' R u(n), and x(n+n+1)=f|x(n), u(n)|. (i.e. Finite-step ahead optimization.)

The cost function, J(n) minimizes the square state error of the next state with respect to u(n) while limiting the control costs to get to the next state. This may be described as a "one-step-ahead optimizer." The quadratic term may be made up of two parts, the (x' Q x) part being the cost associated with state errors, and the (u' R u) part as the penalty on the amplitude of the control signal required to bring the system to the desired next state. This latter part prevents a solution requiring excessively large control energies.

The scalar matrices of Q and R allow the designer to weight the cost function to favor particular characteristics of a control law. Various examples of network training using the SQP method may be used.

The SSC differs from the CMAC network in several key areas. A CMAC network requires many more weights than a state-sampled controller. An SSC requires far less memory. Memory requirements may be determined by spectral analysis of a desired SSC controller, rather than a guess of input sensor resolution.

Moreover, generalization in a state-sampled controller results from ideal interpolation of a sampled state space function based on image processing theory. By contrast, CMAC generalization assigns weights near to a point of interest in the control domain a plus correlation, and far weights a zero correlation. This is mathematically limiting. Such an approach effectively creates a rectangular spatial window in a state space domain, although not recognized or mentioned as such in the prior art.

However, in an apparatus and method in accordance with the invention, the generalization of a state-sampled controller mathematically may fit the spectral properties of the controller with near weights having a positive correlation and far weights having a variable correlation according to a sinc function. Thus, the mapping or transformation into a spectral (frequency) domain (from a spatial domain) still provides excellent representation of a control law.

By contrast, a CMAC generalization results in errors in the spectral domain, due to failure to accommodate the existing, non-trivial weights throughout the entire range of interest in the state spaces defining the spatial range, exacerbated in the spectral range. That is, to the extent that certain weights are truncated, assigned values of zero arbitrarily, additional error is introduced into the solution found by a CMAC controller.

Figure 11:
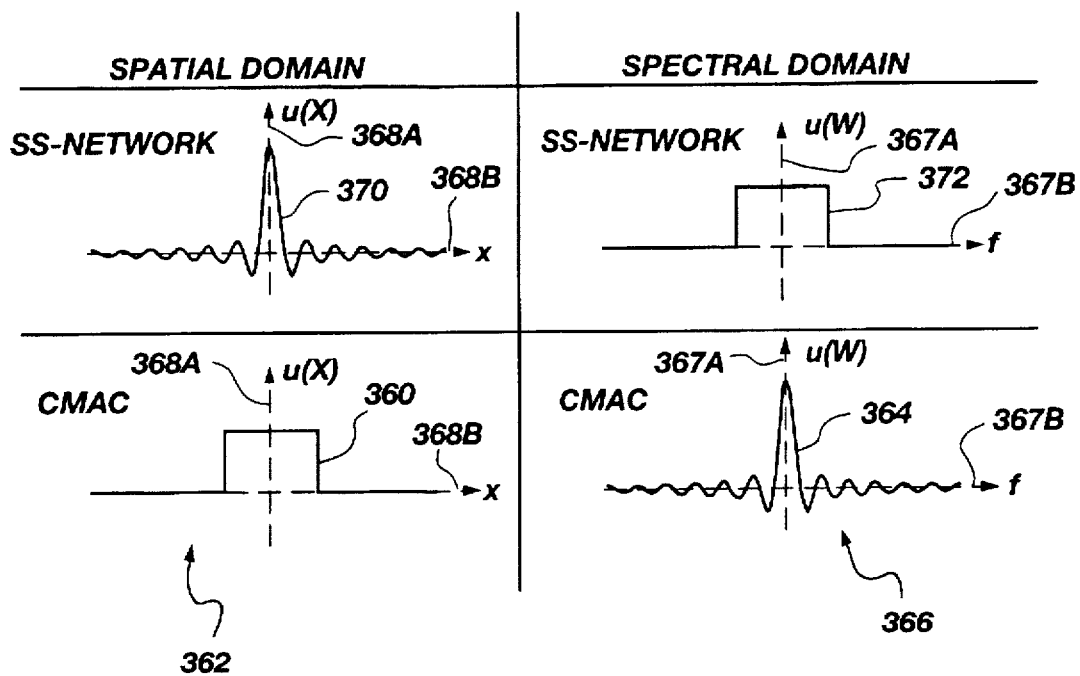
FIG. 11 is a graphical representation of a TSSNC and a CMAC, showing generalization functions compared in spatial and spectral (frequency) domains.

Referring to FIG. 11, one will note significant performance distinctions between a CMAC and an SSC. One may consider the properties of windows capturing certain neighboring weights within a state space, and how they transform from the spatial domain 362 to the frequency domain 366. The function axis 367A in a spectral domain identifies a value of the spectral function over a range in a frequency domain 366 measured along a frequency axis 367B.

No prior art known to date has viewed CMAC as transforming a function 360 from a spatial domain 362 to a frequency domain 366. In view of the invention, however, one may note that a rectangular generalization function 360 in a proximity window of the spatial domain 362 may analytically extend methods used in a CMAC system. This generates a control function 364 rippled in a frequency-domain 366.

By contrast one may inquire into a state-sampled controller 12. A generalization function 370 for the SSC 12 in the spatial domain 362 has a value measured along a function axis 368A over a range measured along a spatial axis 368B. This function 370, a sinc function 370, equates to a rectangular function 372 or window in the spectral domain 366. One may review additional information related to this signal processing phenomenon in A. B. Oppenheim and R. W. Schafer, *Discrete-Time Signal Processing*, Inglewood Cliffs, N.J., Prentice-Hall, 1989. This phenomenon relates to a truer generalization based on frequency content within a range of interest in a state space rather than the proximity of two or more states within a state space. Thus, an SSC 12 may be thought of as an ideally sampled network with generalization in the state-frequency domain rather than in a spatial domain.

The SSC 12 may store a control function as a finite number of weights. An interpolation function is used to generalize the samples in the table of weights across the entire state space. By contrast, a CMAC controller sums together weights of nearest neighboring weights within some narrow window (subset of the range of interest), where nearest is with respect to state space variables.

In an SSC 12, a multi-dimensional control law may be sampled over the entire range of its possible inputs to specify a matrix of network weights needed to give the proper input/output relationships. Once weights are determined, the SSC may generate the same control law at any particular point in state space as would be achieved by a continuous controller.

SOFTWARE SIMULATIONS

EXAMPLE I

In one experimental model, the differential equations for a cantilevered pendulum were developed to reflect gravitational torque as a cosine function, with nonlinear velocity damping, according to a square law damping term, a forcing torque, and unknown scalar constants. The conventional form of differential equations was used with scalar coefficients. Like many control problems, the physics of such a plant are well known, and the form of the differential equations is known, although the exact coefficients for each term of the differential equations are unknown. The cantilevered pendulum is an interesting problem in that the controlling equations are nonlinear in both state variables, and the solution is stable to a wrong steady-state position. In this particular example, very light damping was used to encourage long settling times (or instability).

Forty-nine weights were used to define a relationship between the two input states and a control torque, using a sampling pattern of a seven-by-seven matrix of weights. An equivalent performance by a CMAC controller could require as many as 65,536 weights in a 256 by 256 array. Even with a 100 to 1 hash mapping, 655 weights would be required.

Using an iterative least squares optimization program, the system determined an optimal control function, u(n), resulting in an optimal control function or control surface. When this control surface was used as the driving function, the response of the plant to initial error was excellent. The SSC 12 achieved the desired steady state in a minimal time without overshoots or offshoots in trajectory.

Figure 12:
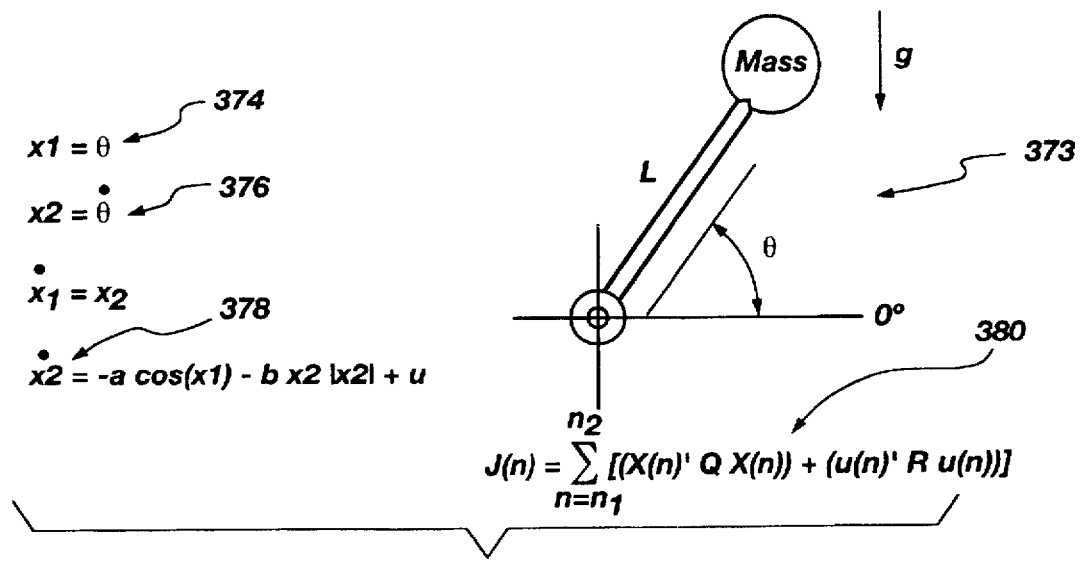
FIG. 12 is a schematic diagram of a cantilevered pendulum system and governing equations.

Referring to FIG. 12 the governing equations for a cantilevered pendulum 373 are differential equations in angular position 374, angular velocity 376, and angular acceleration 378. Suitable substitutions of terms permit formulation of a cost function 380. This resulting cost function J(n), may be minimized over a sample ranging from a beginning time n1 to an ending time n2.

Figure 13:
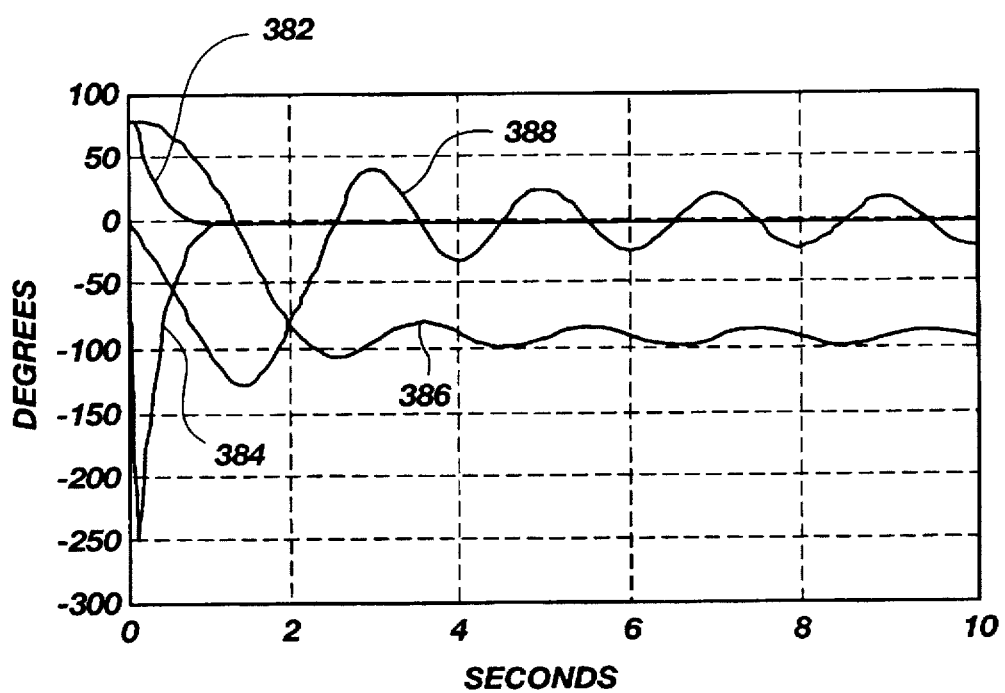
FIG. 13 is a chart illustrating uncontrolled and controlled responses of the apparatus of FIG. 12 as modeled.

Referring now to FIG. 13, simulation of the pendulum 373 is illustrated. The optimized, controlled, angular position response 382 in degrees, and optimized, controlled, angular velocity response 384 in degrees per second, show no overshoot or oscillation. One may compare the responses 382, 384 to the uncontrolled angular position 386 and velocity 388 responses of the SSC 12 applied to the cantilevered pendulum 373.

Samples of a control surface may be used to form the weights of an SSC. However, to illustrate the training process, weights may be started as small random values. During each iteration of a procedure, such as a quadratic programming procedure, for example, the weights may be adjusted using a least mean squared (LMS) algorithm to minimize the "one-step-ahead" cost function. The cost function to be minimized may be expressed as $J(n)=x(n+1)'Qx(n+1)+u(n)'R u(n)$, to be minimized for u(n). In this case, $x_1(n+1)=x_1(n)+x_2(n)\Delta t$ and $x_2(n+1)=x_2(n)-\{10\cos(x_1(n))-2x_2(n)|x_2(n)|+u(n)\}$.

Figure 14:
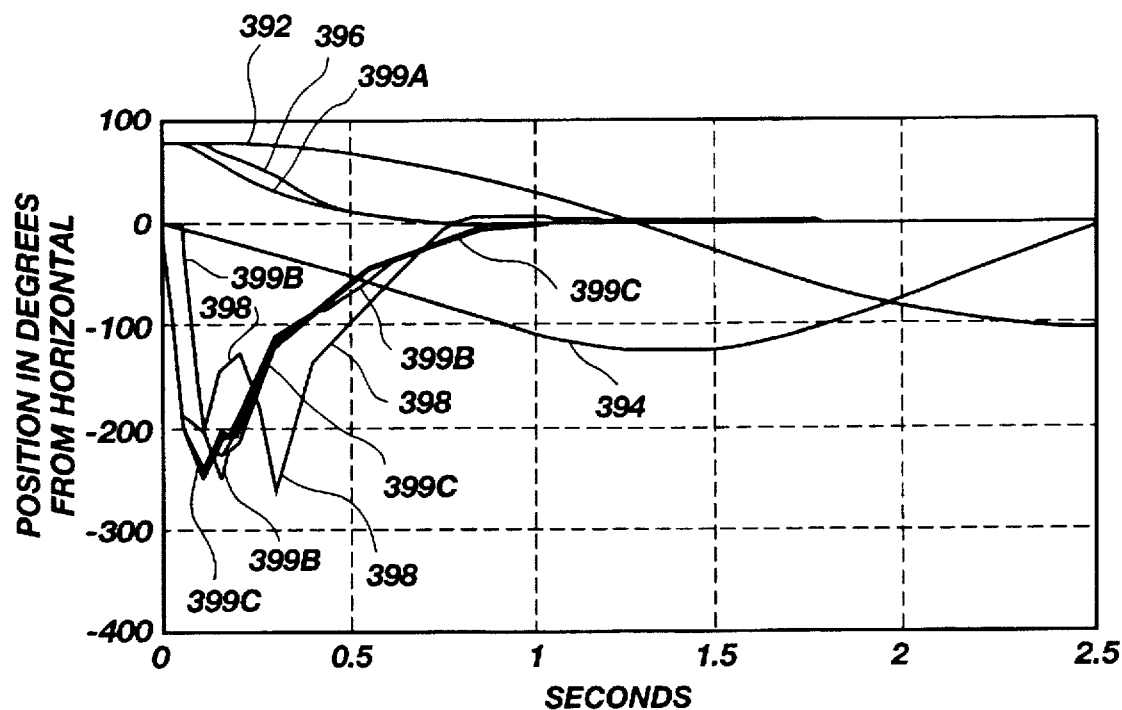
FIGS. 14 and 15 are charts of training results showing an uncontrolled response and the first ten iterations of controlled response for angular velocity and angular position for the apparatus of FIG. 12 during training, with the optimized response after training illustrated in FIG. 15 for a seven-by-seven state-sampled controller.
Figure 15:
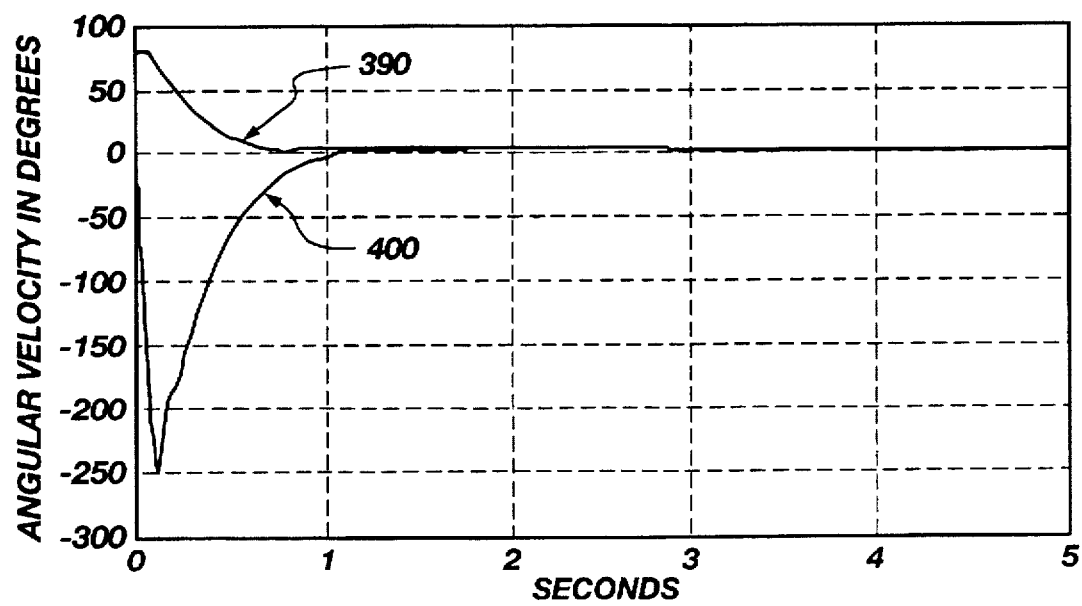

Referring to FIGS. 14–15, the results of the first ten experimental iterations are illustrated. Even though the uncontrolled plant was under-damped, and the steady-state position was not the desired position, the SSC learned quickly. Learning was rapid enough to keep the system bounded and convergent. The system converged to the desired position, even on the first iteration.

Referring to FIGS. 14–15, units are angular per time as in FIG. 13. The uncontrolled position 392, and uncontrolled velocity 394, are readily controlled in the position 396 and velocity 398 of the first iteration during training and under control. Meanwhile positions 399A include the second through tenth interactions of training. Likewise the velocities 399 B, corresponding to the second iteration, and 399C, corresponding to the third through tenth iterations, showed rapid training.

In FIGS. 14–15, the system appeared to be well behaved from the beginning of training, and converged quickly to the same control law found by using classical optimization techniques and having complete knowledge of the plant parameters. This occurred even though only the form of the differential equation was used, and no other parameters were used to determine weights. Meanwhile, any difference between the continuous optimal control response and a response from an SSC was insignificant. One may also note that the SSC response, using a seven-by-seven array of weights, gave excellent control. The sum of squared errors showed no substantial improvement after 10 iterations, even when run to 200 iterations.

Referring to FIG. 15, the position 390, and velocity 400 obtained in an actual experiment. In this instance, the position 390 and velocity 400 of the pendulum 373 were controlled by the SSC 12 using the optimized weights obtained during the training illustrated in FIG. 14.

EXAMPLE II

Figure 16:
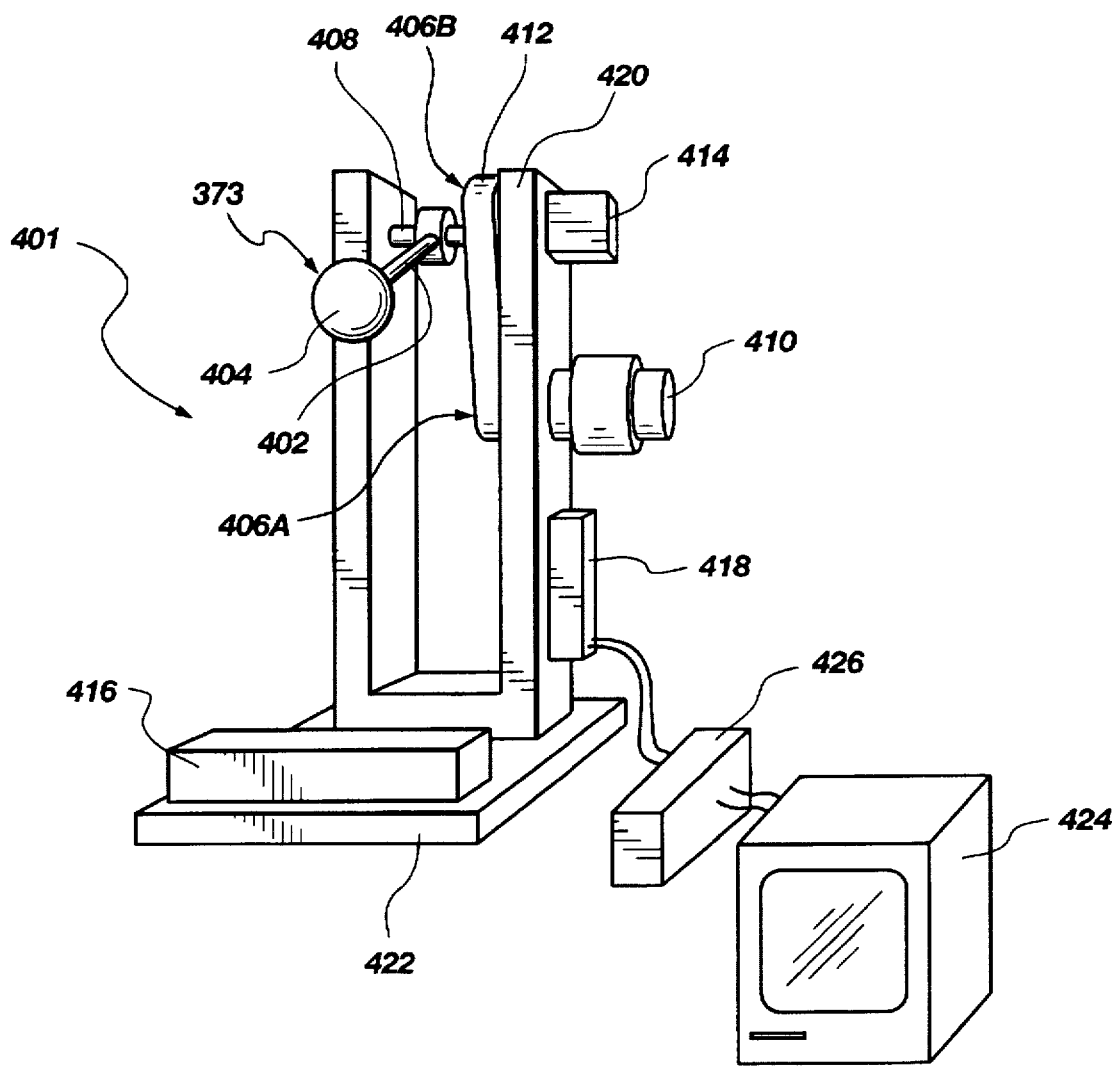
FIG. 16 is a schematic perspective representation of a hardware test configuration for the cantilevered pendulum.

Referring now to FIG. 16, additional details of a pendulum 373, as implemented in an experimental apparatus 401, are illustrated. The cantilevered pendulum 373, comprising a beam 402 and mass 404, is driven by the drive wheels 406A, 406B operating to rotate the axle 408. A motor 410 connected by a belt 412, which happened to be of a toothed type, to the axle 408 provided torque to resist falling of the pendulum 373. The torque was carried from the drive wheel 406A at the motor 410 to the drive wheel 406B at the axle 408. An angular position sensor 414 fed back the position of the drive wheel 406B and the beam 402. No attempt was made to measure or characterize the motor 410, pendulum 373, or angular position sensor 414. The power supply 416 supported the motor 410 and electronics module 418. The frame 420 on a base 422 provided mechanical support for the pendulum 373.

The computer 424 acted as SSC 12, trainer 16, controller 18, and data logger for the apparatus 402 as the plant 14. Communication was via an RS-232 serial port at 9600 baud through an A/D converter and D/A converter in an interface module 426. The analog interface in the module 426 sent pulse-width-modulated motor drive signals to the motor 410 by way of an electronic driver assembly in the electronics module 418, based on a 68HC805B6 micro-controller. Position feedback from a potentiometer in the sensor 416 was filtered and differentiated to produce an analog angular velocity signal. Signals from the potentiometer of the sensor 416 were digitized to 8-bit resolution and transmitted to the computer 424 through the serial port.

The order and range of the plant were determined from Newton's laws of motion, resulting in the equations:

$$\Sigma M(t) = J\ \alpha(t) = -a\ \cos(\phi(t)) - b\ \omega(t) + \text{torque}(t),$$

and $$(d^2\phi/dt^2) + a\ \cos(\phi(t)) + b\ \omega(t) = \text{torque}(t).$$

Based on the differential equation, two state variables were picked to correspond to angular position and angular velocity, characterizing the plant. No other dynamic quantities appear in the equations. Angular position was a variable that wraps around each 360°, and thus was limited to ±180°.

These values yield a state range of 360° for position and ±180° per second for velocity. The plant description is only second order, so relatively low spatial sampling rates are adequate, resulting in a seven-by-seven state-sampling grid. The forty-nine weights in such a seven-by-seven array will make up the SSC.

A time sampling rate of 20 hertz was chosen, but frequencies higher than anticipated arose due to flexibility and vibrational modes within components of the plant 14, 401. Thus, an increased sampling rate to 100 hertz eliminated instabilities due to aliasing.

Figure 17:
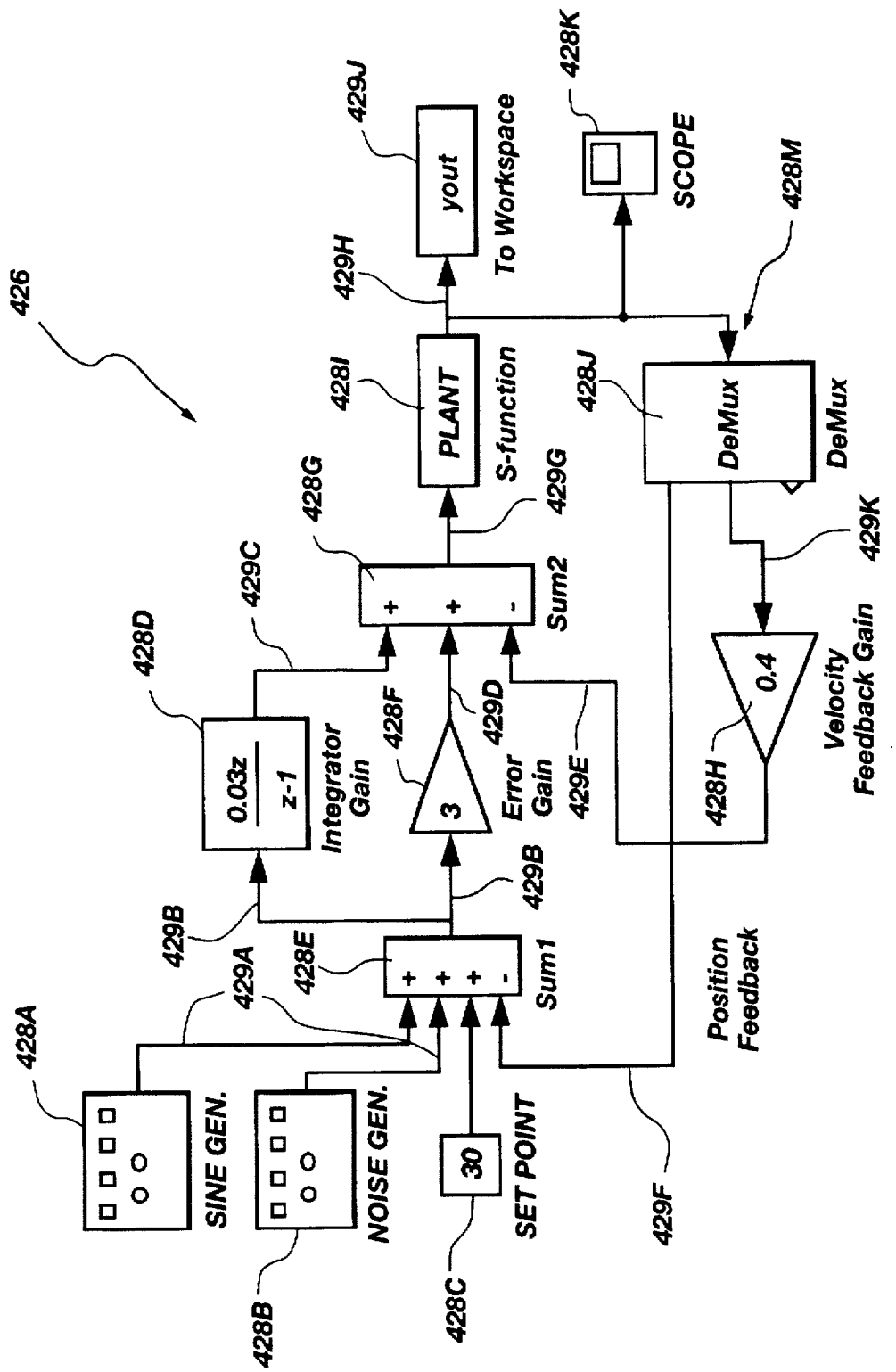
FIG. 17 is a control block diagram for a PID controller, suitable for use in training one embodiment of an apparatus in accordance with the invention.

Referring to FIG. 17, a PID 426 is illustrated. Training was accomplished on-line using a PID controller 426 created in SIMULINK. The PID 426 includes a sine generator 428A, noise generator 428B, and set point generator 428C feeding input signals 429A into a summing device 428E, which outputs a signal 429B to an integrator 428D and an amplifier 428F.

The signals 429C, 429D, 429E, from the integrator 428D, the amplifier 428F, and from a feedback loop 428M, respectively) from the plant 428I, may be input into a second summing device 428G. The output 429G of the second summing device 428G may be fed into the plant 428I as a control signal. The plant 428I then has an output signal 429H reflecting an output, which signal 429H may be stored as a datafile 429J. The signal 429H may be reflected on a scope 428K.

The output signal 429H may be de-multiplexed in a de-multiplexer 428J, which then provides a signal 429F into the first summing device 428E, as well as a signal 429K into an amplifier 428H for velocity feedback gain. Thus, the output of the amplifier 428H may be input into the first summing device 428E with the inputs 429A. Meanwhile, the inputs 429C, 429D, 429E may be provided to the second summing device 428G. After the network 12 trained to a stable approximation of the PID 426 controller, the PID 426 controller was switched off, and the SSC controlled the plant 14 independently. A Lagrangian minimization algorithm was incorporated to fine tune the weights to the optimal value. Pseudo-code for an on-line training algorithm is illustrated below:

---
Until end
   Read the angular position and velocity of the pendulum.
   If less than 10 data points
      Use PID controller to calculate new drive value.
   else
      Use previous data points and last model coefficients
        to update predictive model (such as ARMA).
      Use last drive value for iteration starting value.
      Iterate to find drive value that minimizes the cost-function
        of the predicted next state.
   end if
   Update control weights
   Jump to the start.
---

One may note that a variety of algorithms may be used for the predictor function in the minimization routine in the algorithm. First-, Second-, and Third-order linear predictors, as well as ARMA models of various orders, were tried, with little difference found therebetween. The system converged to the same optimal weights as determined by the cost function.

In the training phase, fewer than ten iterations with the parallel PID controller were needed. The Lagrangian minimization algorithm converged to a final value in less than 20 additional iterations, with each new iteration minimizing the cost function to a smaller, better value. After 20 iterations, no further improvement was noted in the control function, and the controller was assumed to be trained. After training, step tests were conducted to compare the results of the hardware plant and controller system with the software simulation.

Six test were conducted using different initial conditions for position and velocity. In each test, the step response was similar to the computer simulated response. An additional high-frequency component was noted, due to additional structural vibration modes in the drive mechanism and the arm of the pendulum not modeled in the software simulations.

In the tests, the drive signal indicated a response to the high-frequency modes of vibration, even though these were not included in the predicted model. Thus, the SSC accommodated and minimized these high-frequency modes automatically. The drive signal was limited to ±255 due to the resolution of the pulse-width-modulator. Even with this nonlinearity introduced, which also was not part of the predicted model, the Lagrangian minimization routines still converged to a stable, near-optimal control function. Step tests, using step functions as inputs to the apparatus 401 for position 374 and velocity 376 were conducted with equally good results.

EXAMPLE III

In another example, the trainable state-sampled network controller 12 was implemented for attitude manipulation of a micro-satellite. The 50 kilogram satellite required three-axis attitude determination and control. Attitude manipulation may be accomplished by reaction wheels, magnetic torquing coils, and directed off-axis thrusters.

On board flight computers were deemed to have insufficient speed necessary to implement control algorithms in real time. Moreover, neural network controllers were consider but rejected due to numerous factors including unreliability in training, long training times, and excessive mathematical requirements on the on-board computers.

The design of the SSC began with defining the significant state variables, their range of interest, and the sampling intervals for a control function. This was then augmented by knowledge of the underlying form of the dynamic equations representing the physics of the satellite. The satellite in question was configured so that the principal axes of the moments of inertia coincided with the principal axes of the geometry of the satellite. Thus, Euler's equations for a rigid body were used without excessive cross-terms.

The governing equations were:

$$M_1 = I_1\omega_1 + \omega_2\omega_3(I_3 - I_2);$$

$$M_2 = I_2\omega_2 + \omega_1\omega_3(I_1 - I_3);$$

and $$M_3 = I_3\omega_3 + \omega_1\omega_2(I_2 - I_1).$$

These equations form three, coupled, nonlinear, differential equations. The three state variables of angular rotation about each axis may describe the velocity of the system. A total of ten state variables describe the system.

Angular position is the desired controlled variable and may be calculated by simple integration of velocity with knowledge of initial conditions. Four reaction wheels were mounted in an equi-angular tetrahedron with the axis of each wheel offset by 160.5° from the other reaction wheels. The three angular position variables, the three angular speed variables, and the four reaction wheel speed variables constituted ten state variables. A seven point sampling of a tenth order state space with four control variables would require $4 \times 7^{10}$ or 1,129,900,996 weights. This staggering number of weights is too large for a micro-satellite computer.

The ten dimensional system was partitioned into a number of smaller systems by recognizing that differential equations are in terms of velocities only. Positions about each axis are independent of all state variables except for the velocity about the same axis. Likewise, no cross terms between position and velocity exist.

The motor equations and their torque-to-voltage transfer functions are independent of the state variables of the satellite and therefore can also be viewed as independent controllers. Thus, the controller may be portioned into a three-input, four-output position controller, a three-input, four-output velocity controller, and four single-input, single-output motor controllers. Thus, $4 \times 7^3 + 4 \times 7^3 + 4 \times 7^2 = 2940$ weights.

To achieve a similar degree of control, a CMAC controller, by contrast, would require $256^{10}$ or $1.209 \times 10^{24}$ weights for a 8-bit system without partitioning. With the same partitioning as the SSC, a CMAC system would require: $4 \times 256^3 + 4 \times 256^3 + 4 \times 256^2 = 134.5 \times 10^6$ weights. Hash mapping may reduce the number of needed weights to $1.345 \times 10^6$, which is still more than fifty times as many as required by the SSC.

Figure 18:
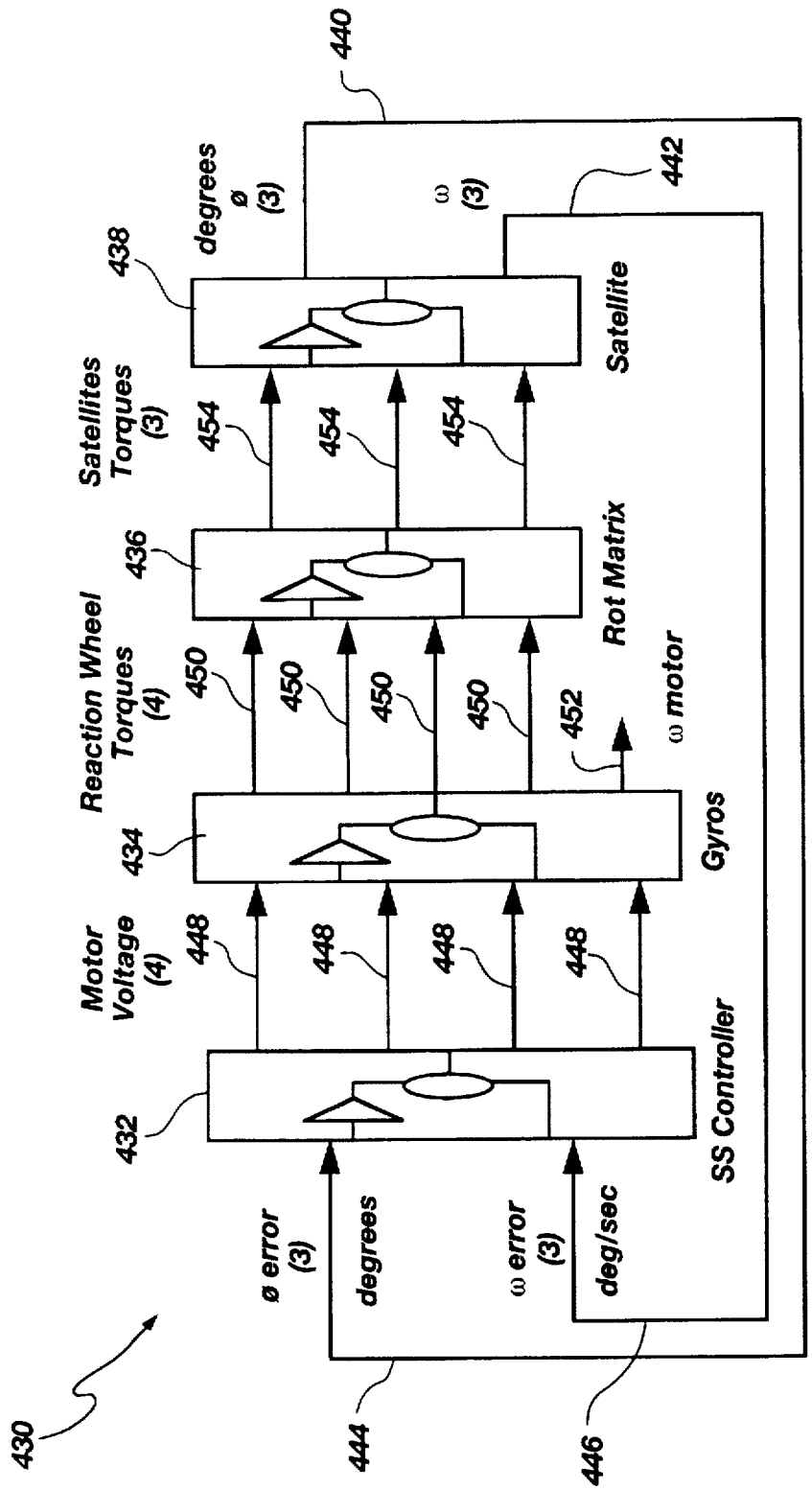
FIG. 18 is a schematic control diagram illustrating a SIMULINK modeling of a satellite attitude control system using a TSSNC.

Referring to FIG. 18, a SIMULINK four-block model of the satellite is illustrated. The SSC 12 is partitioned into separate three-input, four-output, position and velocity controllers 12. The overall structure of the reaction wheel module includes four motors. The dynamics of each wheel with a classical feedback controller result in the block diagram shown in FIG. 18, using standard control theory notation.

A SIMULINK model 430 for a satellite may include state-sampled controllers 432. A single SSC 12 may be used, although four are used here, as illustrated.

The controllers 432 send signals 448, corresponding to each gyroscope 434, to the gyros 434. Signals 450, 452 output by the gyros 434, provide reaction wheel torques, and motor speed (angular velocity), respectively. Thus, the signals 448, representing voltages provided to the motors in the gyros 434 result in the torques 450.

Meanwhile, a rotational matrix 436 may be used to translate the reaction wheel torques 450 into satellite torques 454. In actual hardware, four gyroscopes 434 in a regular tetrahedral arrangement create three torques 454 in roll, pitch, and yaw directions, notwithstanding that four gyroscopes 434, having four individual axes, exist. That is, only three independent orthogonal directions actually exist.

Thus, the reaction wheels 434 impose on the satellite 438 the satellite torques 454 in roll, pitch, and yaw directions providing a position 440 and velocity 442 for the satellite about each respective axis (roll, pitch, yaw).

The angular positions 440 and velocities 442 are also fed back as the inputs 444, 446, respectively, measuring the error in position and velocity, respectively. One will note that the position and velocity are resolved and controlled independently, thus reducing coupling and the number of required equations for solution. The satellite dynamics may be based on Euler's equations. The minimization may be accomplished by a Lagrangian minimization.

Reaction wheels 434 are placed in a regular tetrahedron so that the sum of equal torques 450 of all forms and orders, results in a net zero torque 454 on the satellite 438. This helps assure equal usage of each wheel 434 during nominal operations. The values of the elements in the three rows of a three-by-four rotational matrix relating or mapping the motor torque vectors into satellite coordinates are: −1.000, 0.3333, 0.3333, 0.3333 in row 1; 0.0000, 0.9428, −0.4714, −0.4710 in row 2; and 0.0000, 0.0000, 0.8165, −0.8165 in row 3. The cost function, J, to be minimized for this controller is made up of several terms: $J = \phi P\phi' + \omega Q\omega' + uRu'$, where $\phi$ is position error, $\omega$ is velocity error, and u is reaction wheel drive.

The first term is a penalty for error in an angular position $\phi$ scaled by matrix P. Next, any angular velocity ($\omega$) scaled by a matrix Q is penalized. Third, in order to keep any one reaction wheel 434 from saturating in speed 442, a penalty is placed on the absolute value on each of the four reaction wheels drive signals (u) 448 scaled by the matrix R.

The Lagrangian minimization algorithm was applied to train each of the controllers 432. Results of step tests starting with a velocity error and a positional error are shown in FIGS. 19 and 20, respectively.

Figure 19:
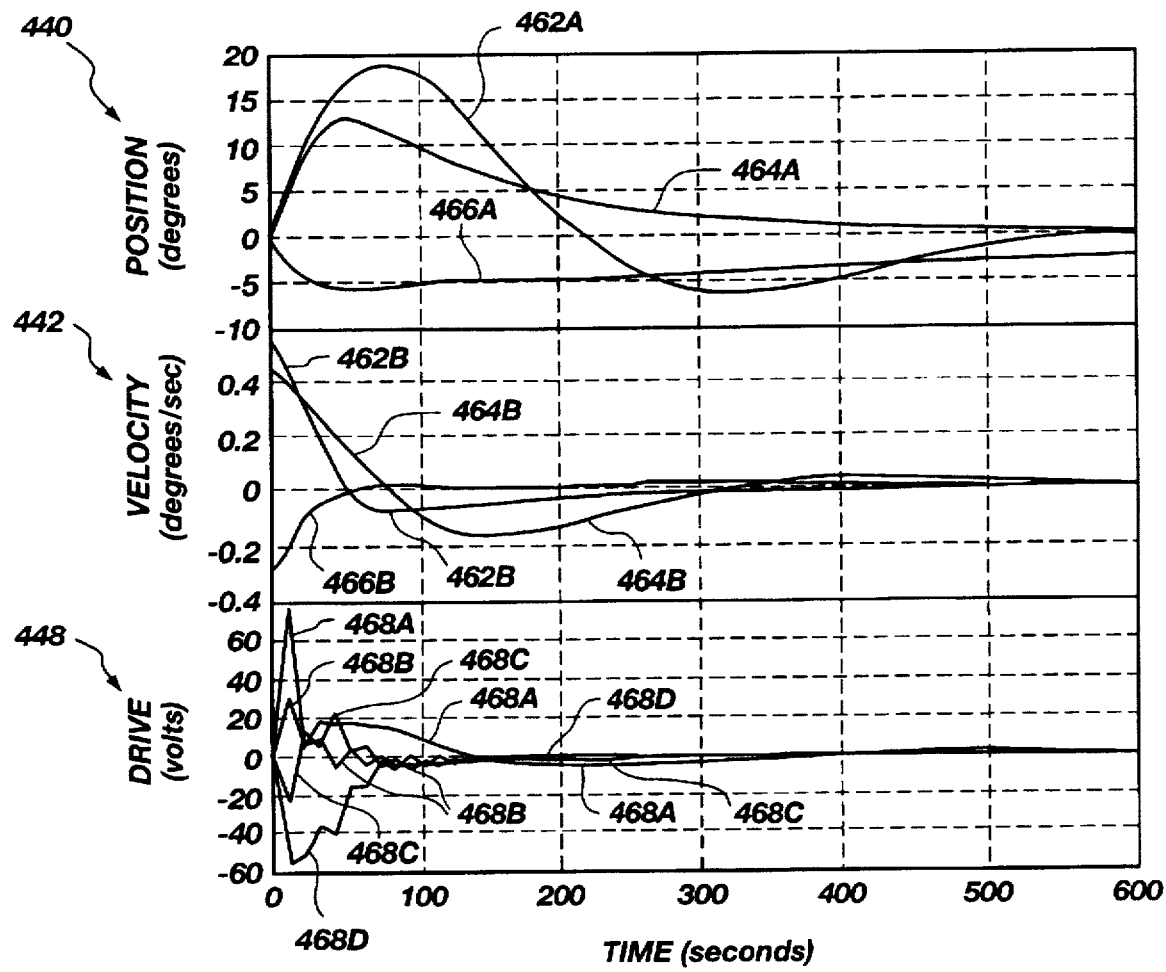
FIG. 19 is a chart illustrating responses of position and velocity, with corresponding drive voltages to gyroscopes, for a satellite of FIG. 17, in response to a step test of velocity error.
Figure 20:
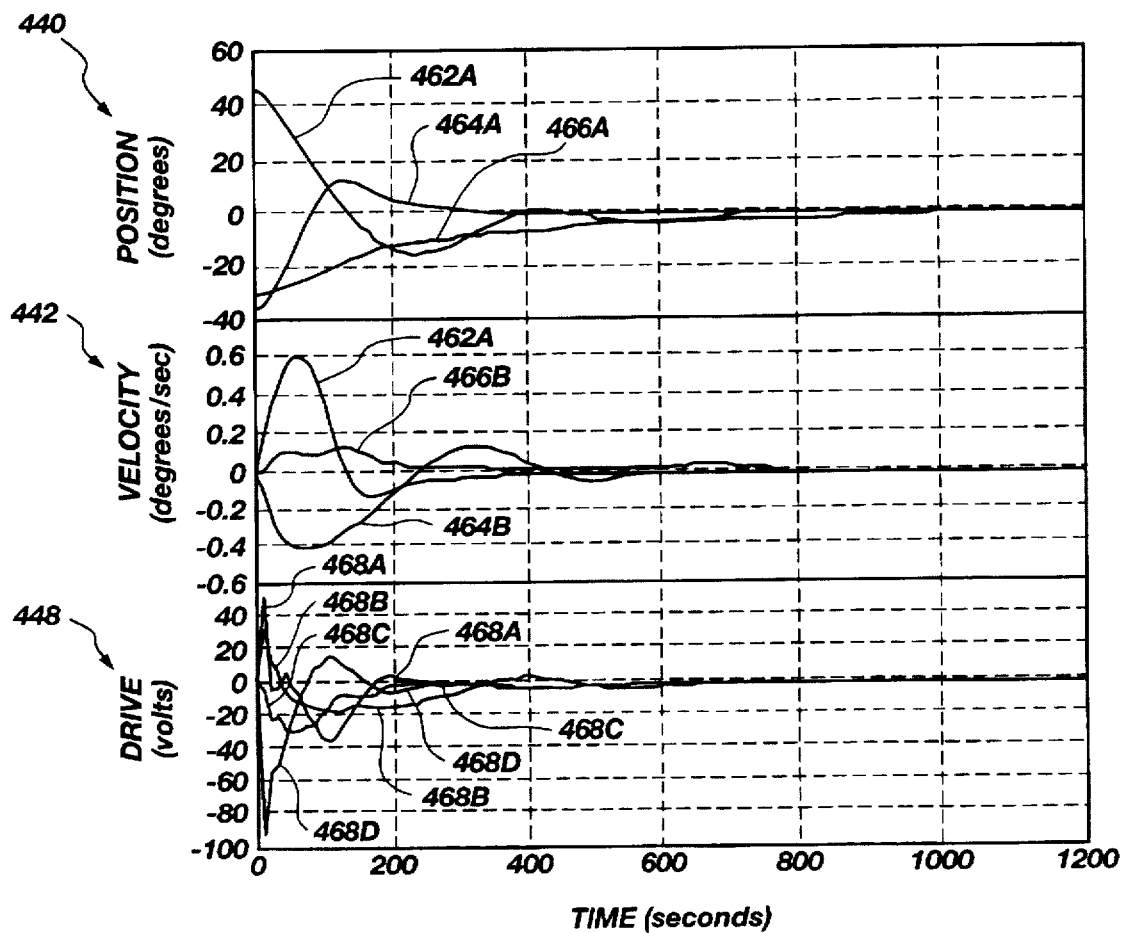
FIG. 20 is a chart illustrating responses of position and velocity, with corresponding drive voltages to gyroscopes, for a satellite of FIG. 17, in response to a step test of position error.

Referring to FIGS. 19 and 20, as well as FIG. 17, the roll 462A, pitch 464A, and yaw 466A positions are shown. The controller 432, for velocity, corrected for errors of up to two degrees per second within 600 seconds (10 minutes) without exceeding the capabilities of the reaction wheel 434. The roll 462B, pitch 464B, and yaw 466B velocities correspond to positions 462A, 464A, 466A, respectively. The controller 432, for position, corrected for positional errors within 1200 seconds (20 minutes) under equivalent circumstances. The voltages 468A, 468B, 468C, 468D were output to each respective gyroscope 434 or reaction wheel 434 in the tetrahedral arrangement to provide corrections to velocity 462B, 464B, 466B and position 462A, 464A, 466A.

Figure 21:
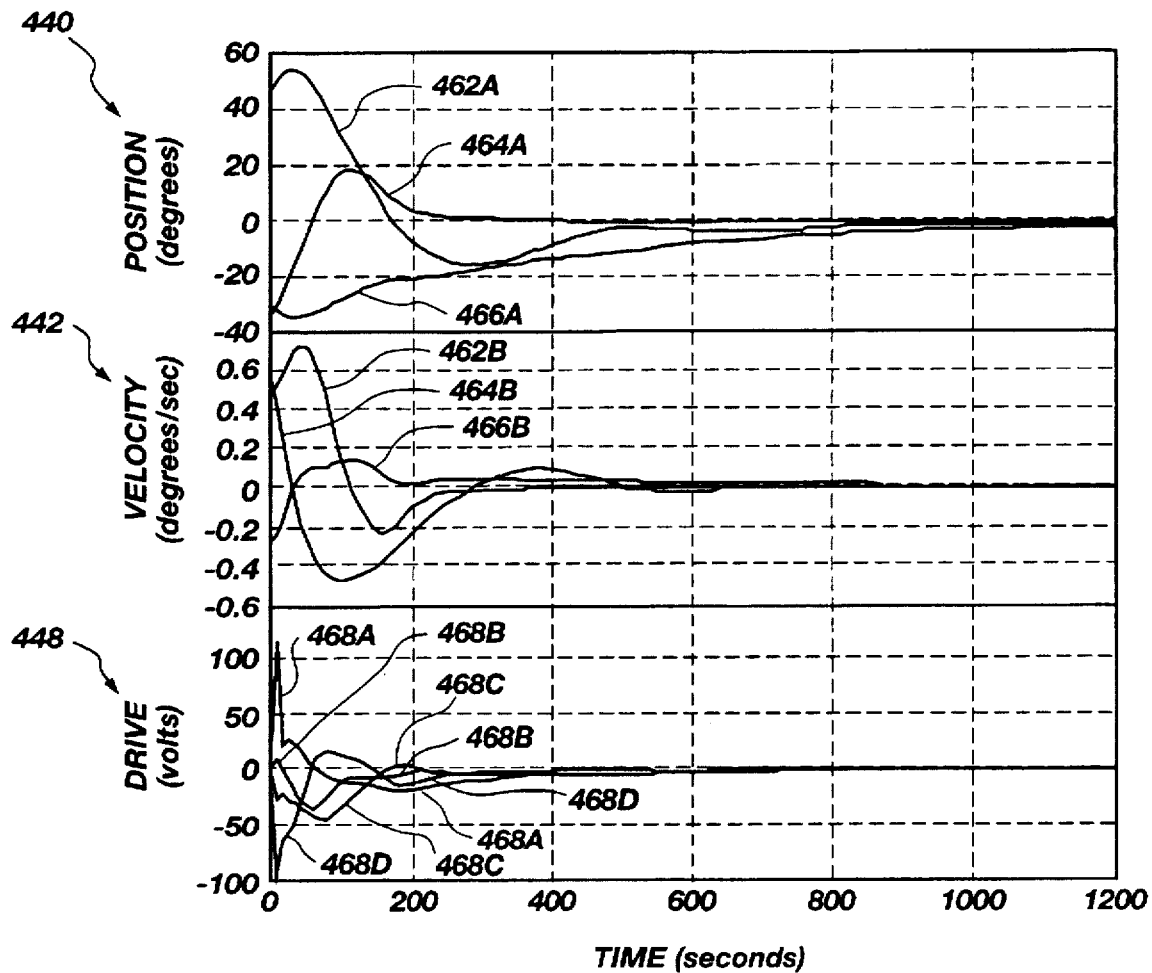
FIG. 21 is a chart illustrating responses of position and velocity, with corresponding drive voltages to gyroscopes, for a satellite of FIG. 17, in response to a step test of random velocity and position errors.

Referring to FIG. 21, a step test was also conducted for simultaneous, random velocity and position errors. Such a circumstance may occur after a satellite has been idled or taken out of service for a time. A satellite may then have some random angular position and velocity. A step function was imposed on both position 440 and velocity 442. The responses are illustrated over time in FIG. 21 using the same nomenclature as in FIGS. 19 and 20.

Under unusual circumstances, such as recovering from a partial control failure or power shutdown, a satellite may have a completely random position and rotation. In such a test, with those initial conditions, the satellite completely recovered to zero error in rotational velocity and position within 1200 seconds (20 minutes).

One may note that the settling time of a system may be modified by changing the weights of the cost function. The optimal criteria for each performance test may reach a stable, minimal error stage in a particular time frame desired. In the tests here, the criterion was to reach such stable, minimal error state within ten to twenty minutes using a minimum amount of control energy possible. Different control criteria may require a different cost function and may yield results optimized to other parameters.

CONCLUSION

A trainable, state-sampled network controller (TSSNC) may replace more computationally intensive controllers in certain applications. Although small computers (microcomputers, personal computers, and the like) may have great utility as controllers in certain circumstances, nonlinear optimization in real time has not previously been possible. A TSSNC handles this difficulty by performing nonlinear optimization either off-line in a training mode, or over a long period of time as an adaptive controller.

During real-time operation, where the TSSNC must yield outputs spaced only milliseconds apart, the processor of the TSSNC must perform only ideal interpolations based on a look-up table. Many micro-processors, micro-computers, and the like can accomplish such a task in the needed time frame to produce real-time results. Thus, a TSSNC makes network control a practical solution for many more applications than previous controllers.

The TSSNC may be viewed as an ideally sampled linear network controller. The ideal sampling in state space is based on the frequency variations, inflection points, or changes in direction of a control function of interest within the range of the state space of interest. Such ideal sampling of state space based on frequency, reduces memory and training requirements by many orders of magnitude.

A generalized, robust controller is derived from a combination of several is coefficients or weights to form the net control output. Further memory-reducing techniques useful in other control technologies may also be incorporated into the controller design. Training may be by supervised learning, u or by adaptive techniques, such as those used by CMAC and neural networks, or through Lagrangian minimization to decrease the error at each new subsequent state, while maintaining limits on drive amplitudes.

Thus, although not requiring a foreknowledge of the system to be controlled, the TSSNC may use any information as to the form of the governing differential equations corresponding to a plant to be controlled. In any event, some arbitrary system of variables relating to a plant or components within a plant, along with an appropriate maximum order of differentiation with respect to each parameter selected, may result in a suitable system that may thereafter be trained to identify the significance of each parameter (variable and differentials thereof) in the state space of interest.

Since inputs for the TSSNC may be the measured values of variables within the state space of interest, virtually any system, linear or nonlinear, may be controlled. Thus, a building, having a complex system of ducting, chilling, heating, temperature measurement, air flow measurement, air movement, fans, and the like, may be controlled by measurement of a selected set of variables, and a state space including those variables.

Since many systems are controlled by operation of a motor driving a process or machine, the TSSNC may be used to control any driving motor, whether electrical, internal combustion, turbine, aspirated, fuel-injected, or the like. Such control for automobiles may be used to provide optimum combustion conditions at any given speed of the motor, atmospheric pressure and temperature, load, power delivery rate, fuel economy, cost, time, or the like. That is, any variable of interest may be included in the state space, and a suitable sensor may be installed to provide feedback to the TSSNC.

Virtually any control situation may benefit from a trainable state-sampled network controller. This may be very advantageous where certain information concerning a plant is lacking for almost any reason. In this and other situations, the TSSNC is adaptable to a classical control law, yet can use a posited form of a control law based on any significant, measurable outputs of a plant to be controlled. Thus the TSSNC does not require substantial foreknowledge of the system controlled, yet can accommodate virtually any information that is known to reduce training and operating time for control calculations.

It is contemplated that some of the physical plants that may be controlled by one or more TSSNCs include, for example, guidance systems for land, air, water, and space vehicles; navigation systems, particularly for land, air, and space applications; attitude control systems in spacecraft and autopilots for aircraft; propulsion systems whether electrical, heat engines, internal combustion or external combustion engines, such as turbines; automotive or vehicle systems including security, powerplant optimization, carburetion, fuel injection, ride dynamics, load support, height, fuel economy, steering, braking, acceleration, emissions control, and the like; process control systems including chemical, heat and mass transport, refining, smelting, curing, aging, crystal growth, and the like; machine control systems, whether for transport, cutting, welding, assembling, or the like; robotic systems; manufacturing line control systems; inventory management systems for both incoming, outgoing, and stockpiled materials and products; storage and retrieval systems, particularly automated, computer-addressed, random-access, high-density, storage operations; image processing systems, such as commercial and private photography, video processing, infrared sensing, manufacturing or military image sorting and classification, medical imaging, and the like; space heating, ventilating, and air conditioning systems, whether in vehicles, buildings, or machines; and certain biological environments and processes, including, but not limited to, growth environments, whether micro or macro-biological in nature.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus comprising:

sensors connected to a plant for sensing outputs of the plant;

a memory device for storing a table of weights corresponding to state variables reflecting the outputs sampled at discrete locations in a range of a state space over which a form of a control law is operative, the form of the control law being represented by a matrix equation in terms of state variables having unknown coefficients, and constituting a transformation into the state space of a form of a mathematical description of the plant; and a programming processor for providing the unknown coefficients by interpolating the table of weights with an interpolation function, for solving the matrix equation, and for providing a control output reflecting a solution to the matrix equation.

2. The apparatus of claim 1 wherein the interpolation function is an ideal interpolation function.

3. The apparatus of claim 1 wherein the interpolation function has a frequency in a dimension of the state space higher than a frequency of the control law in the dimension.

4. The apparatus of claim 3 wherein the frequency of the interpolation is higher than the highest significant frequency of the control law in the dimension.

5. The apparatus of claim 1 wherein the table of weights is determined by optimization.

6. The apparatus of claim 1 wherein the table of weights is determined by optimization of a cost function.

7. The apparatus of claim 1 wherein the table of weights is determined by sampling an output of the plant corresponding to a plurality of states in the state space.

8. The apparatus of claim 1 wherein the table of weights comprises values determined at a frequency in a dimension of the state space corresponding to an optimized distance with respect to a frequency of the form of the control law in the dimension.

9. The apparatus of claim 1 further comprising a training computer for providing the table of weights.

10. The apparatus of claim 9 wherein the computer further comprises a processor for calculating the table of weights from the outputs of the plant.

11. The apparatus of claim 10 wherein the processor is programmed to provide the table of weights using an optimization process.

12. The apparatus of claim 11 wherein the optimization process operates to minimize a cost function.

13. The apparatus of claim 1 wherein the transformation comprises a system of linear equations representing the mathematical description comprising nonlinear governing equations.

14. The apparatus of claim 1 further comprising a plant selected from a group consisting of a guidance system; navigation system; attitude control system; propulsion system; automotive system; process control system; machine control system; robotic system; manufacturing line control system; inventory management system; storage and retrieval system; image processing system; space heating, ventilating, and air conditioning system; and biological process management system.

15. A method for controlling a plant, the method comprising the steps of:

providing sensors connected to the plant for sensing outputs corresponding to components comprising the plant;

providing a form of mathematical description for the plant, the form comprising a differential equation in at least one variable having an unknown first coefficient, the variable corresponding to an output of the outputs;

transforming the mathematical description into a form of a control law operative in a state space where a dimension of the state space comprises at least one variable, the form of the control law comprising a vector equation in the state space, and the vector equation having at least one unknown second coefficient selected to be determinable from first weights;

forming a table of weights corresponding to the output sampled at discrete locations in a range of the state space;

providing an interpolation function for interpolating the table of weights;

solving the vector equation for a control output, using values of the first weights provided by the interpolation function for interpolating the table of weights; and forwarding to the plant a control signal which corresponds to the control output.

16. The method of claim 15 wherein the control law is a classical control law in accordance with classical control theory.

17. The method of claim 15 wherein the control law is linear.

18. The method of claim 15 wherein the interpolation of weights is completed over the entire range of state space over which the control law is applied by a user.

19. The method of claim 15 wherein the interpolation function corresponds to a mathematically ideal interpolation.

20. The method of claim 15 wherein the sampling frequency is determined from a frequency of the control law in the state space.

21. The method of claim 15 further comprising: selecting a plant from a group of a guidance system; navigation system; attitude control system; propulsion system; automotive system; process control system; machine control system; robotic system; manufacturing line control system; inventory management system; storage and retrieval system; image processing system; space heating, ventilating, and air conditioning system; and biological process management system.

\* \* \* \* \*